(12) United States Patent
Kurioka et al.

(10) Patent No.: US 8,379,317 B2
(45) Date of Patent: Feb. 19, 2013

(54) ZOOM LENS SYSTEM, IMAGING DEVICE AND CAMERA

(75) Inventors: Yoshiaki Kurioka, Osaka (JP); Takehiro Nishioka, Nara (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/186,482

(22) Filed: Jul. 20, 2011

(65) Prior Publication Data

US 2012/0019925 A1  Jan. 26, 2012

(30) Foreign Application Priority Data

Jul. 20, 2010  (JP) .................................. 2010-162511
Jun. 6, 2011  (JP) .................................. 2011-126575

(51) Int. Cl.
*G02B 15/14* (2006.01)
(52) U.S. Cl. ........ 359/682; 359/557; 359/686; 359/687; 359/689; 359/690; 359/740
(58) Field of Classification Search .................. 359/682, 359/686, 687, 689, 690, 740, 557
See application file for complete search history.

(56) References Cited

U.S. PATENT DOCUMENTS 5,835,272 A * 11/1998 Kodama ........................ 359/686

FOREIGN PATENT DOCUMENTS

| JP | H02-093620 A | 4/1990 |
|----|----|----|
| JP | H06-337374 A | 12/1994 |
| JP | H08-122714 A | 5/1996 |
| JP | H08-220436 A | 8/1996 |
| JP | H08-220437 A | 8/1996 |
| JP | H10-170826 A | 6/1998 |
| JP | H11-052245 A | 2/1999 |
| JP | H11-231220 A | 8/1999 |
| JP | 2005-062228 A | 3/2005 |
| JP | 2006-084740 A | 3/2006 |
| JP | 2006-106111 A | 4/2006 |
| JP | 2006-133582 A | 5/2006 |
| JP | 2006-189627 A | 7/2006 |
| JP | 2007-093977 A | 4/2007 |
| JP | 2008-197682 A | 8/2008 |
| JP | 2008-304706 A | 12/2008 |
| JP | 2009-162862 A | 7/2009 |
| JP | 2010-014844 A | 1/2010 |
| JP | 2010-033087 A | 2/2010 |
| JP | 2010-048855 A | 3/2010 |

* cited by examiner

*Primary Examiner* — Evelyn A. Lester
(74) *Attorney, Agent, or Firm* — Judge Patent Associates

(57) ABSTRACT

A zoom lens system comprising: a front unit having negative optical power as a whole and including a first lens unit located closest to the object side; and a rear unit having positive optical power as a whole, wherein at least the front unit moves along an optical axis in zooming, the first lens unit is composed of at most three lens elements, the rear unit includes a lens unit having an aperture diaphragm between lens elements, an air space between which is not varied in zooming, a sub lens unit comprising a part of a lens unit constituting the rear unit moves in a direction perpendicular to the optical axis, and the condition: $0.1 < BF/f_W < 2.0$ ($\omega_W > 72°$, $FNO_W < 2.9$, BF is a back focal length of the entire system at a wide-angle limit, $f_W$ is a focal length of the entire system at a wide-angle limit, $\omega_W$ is a view angle at a wide-angle limit, $FNO_W$ is an F-number at a wide-angle limit) is satisfied; an imaging device; and a camera are provided.

9 Claims, 19 Drawing Sheets

ZOOM LENS SYSTEM, IMAGING DEVICE AND CAMERA

CROSS-REFERENCE TO RELATED APPLICATION

This application is based on application No. 2010-162511 filed in Japan on Jul. 20, 2010 and application No. 2011-126575 filed in Japan on Jun. 6, 2011, the contents of which are hereby incorporated by reference.

BACKGROUND OF THE INVENTION

1. Field of the Invention

The present invention relates to a zoom lens system, an imaging device, and a camera. In particular, the present invention relates to: a zoom lens system which has, as well as a high performance, a small size and a small F-number at a wide-angle limit, and is satisfactorily adaptable for wide-angle image taking; an imaging device employing the zoom lens system; and a camera employing the imaging device.

2. Description of the Background Art

With recent progress in the development of solid-state image sensors such as CCD (Charge Coupled Device) and CMOS (Complementary Metal-Oxide Semiconductor) having high pixel density, digital still cameras and digital video cameras (simply referred to as "digital cameras", hereinafter) are rapidly spreading, which employ an imaging device including an imaging optical system of high optical performance corresponding to the solid-state image sensors having high pixel density. Among the digital cameras having high optical performance, compact digital cameras are increasingly demanded.

For the purpose of easy transportation, further size reduction of the above-mentioned digital cameras is required. Various proposals have been made to realize such compact digital cameras.

For example, there has been proposed a zoom lens, in order from the object side to the image side, comprising a front unit having negative optical power as a whole, and a rear unit having positive optical power as a whole. In the zoom lens, in zooming from a wide-angle limit to a telephoto limit, a lens unit located closest to the object side moves. The zoom lens includes a lens unit having an aperture diaphragm arranged between lens elements, the air space between which is not varied during zooming. A part of lens units included in the rear unit is moved to compensate image blur.

Japanese Laid-Open Patent Publication No. 2006-133582 discloses a zoom lens, in order from the object side to the image side, comprising five lens units of positive, negative, positive, positive, and positive, which move in zooming. In the zoom lens, a diaphragm is arranged between lenses constituting the third lens unit. A part of the third lens unit moves in a direction perpendicular to the optical axis to compensate image blur.

Japanese Laid-Open Patent Publication No. 2009-162862 discloses a zoom lens, in order from the object side to the image side, comprising four lens units of positive, negative, positive, and positive, which move in zooming. In the zoom lens, a diaphragm is arranged between lenses constituting the third lens unit. A part of the third lens unit moves in a direction perpendicular to the optical axis to compensate image blur.

Japanese Laid-Open Patent Publication No. 2010-014844 discloses a zoom lens, in order from the object side to the image side, comprising four lens units of positive, negative, positive, and positive, which move in zooming. In the zoom lens, a diaphragm is arranged between lenses constituting the third lens unit. The entire third lens unit moves in a direction perpendicular to the optical axis to compensate image blur.

Japanese Laid-Open Patent Publication No. 2010-033087 discloses a zoom lens, in order from the object side to the image side, comprising four lens units of positive, negative, positive, and positive, which move in zooming. In the zoom lens, a diaphragm is arranged between lenses constituting the third lens unit. A part of the third lens unit moves in a direction perpendicular to the optical axis to compensate image blur.

Japanese Laid-Open Patent Publication No. 11-231220 discloses a zoom lens, in order from the object side to the image side, comprising four lens units of negative, positive, positive, and positive, which move in zooming. In the zoom lens, a diaphragm is arranged between lenses constituting the third lens unit. A part of the third lens unit moves in a direction perpendicular to the optical axis to compensate image blur.

However, in the zoom lens disclosed in Japanese Laid-Open Patent Publication No. 2006-133582, the maximum view angle at a wide-angle limit is only about 60°, which does not satisfy the requirements for compact digital cameras whose view angle at a wide-angle limit has been increased in recent years. Since the overall lens length is fixed, the front lens diameter is increased. Further, since the back focal length is long, the overall lens length is increased, resulting in insufficient size reduction.

In the zoom lens disclosed in Japanese Laid-Open Patent Publication No. 2009-162862, the maximum view angle at a wide-angle limit is 70°. However, the ratio of the overall lens length to the image height is as high as 20 or more, which results in insufficient size reduction.

In the zoom lens disclosed in Japanese Laid-Open Patent Publication No. 2010-014844, the maximum view angle at a wide-angle limit is 79°. However, since the entire third lens unit is moved in the direction perpendicular to the optical axis to compensate image blur, the size of the mechanism for this movement is increased. Further, the minimum F-number is 3.28, which does not satisfy the requirements for bright lenses.

In the zoom lens disclosed in Japanese Laid-Open Patent Publication No. 2010-033087, the ratio of the overall lens length to the image height is as high as 20 or more, which results in insufficient size reduction. Further, the maximum view angle at a wide-angle limit is only 60°, which does not satisfy the requirements for compact digital cameras whose view angle at a wide-angle limit has been increased in recent years.

In the zoom lens disclosed in Japanese Laid-Open Patent Publication No. 11-231220, the maximum view angle at a wide-angle limit is 73°. However, the maximum F-number is as large as 3.8, which does not satisfy the requirements for brighter lenses. Further, since the back focal length is long, sufficient size reduction cannot be achieved.

SUMMARY OF THE INVENTION

An object of the present invention is to provide: a zoom lens system which has, as well as a high performance, a small size and a small F-number at a wide-angle limit, and is satisfactorily adaptable for wide-angle image taking; an imaging device employing the zoom lens system; and a camera employing the imaging device.

The novel concepts disclosed herein were achieved in order to solve the foregoing problems in the conventional art, and herein is disclosed:

a zoom lens system having a plurality of lens units, each lens unit being composed of at least one lens element, the zoom lens system, in order from an object side to an image side, comprising:

a front unit having negative optical power as a whole, and including a first lens unit located closest to the object side; and a rear unit having positive optical power as a whole, wherein at least the front unit moves along an optical axis in zooming from a wide-angle limit to a telephoto limit at the time of image taking, the first lens unit is composed of at most three lens elements, the rear unit includes a lens unit having an aperture diaphragm between lens elements, an air space between which is not varied in zooming, a sub lens unit comprising a part of a lens unit constituting the rear unit moves in a direction perpendicular to the optical axis to optically compensate image blur, and the following condition (1) is satisfied:

$$0.1 < BF/f_W < 2.0 \quad (1)$$

here, $\omega_W > 72°$, and $FNO_W < 2.9$ where

BF is a back focal length of the entire system at a wide-angle limit, $f_W$ is a focal length of the entire system at a wide-angle limit, $\omega_W$ is a view angle at a wide-angle limit, and $FNO_W$ is an F-number at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, having a plurality of lens units, each lens unit being composed of at least one lens element, in order from an object side to an image side, comprises:

a front unit having negative optical power as a whole, and including a first lens unit located closest to the object side; and a rear unit having positive optical power as a whole, wherein at least the front unit moves along an optical axis in zooming from a wide-angle limit to a telephoto limit at the time of image taking, the first lens unit is composed of at most three lens elements, the rear unit includes a lens unit having an aperture diaphragm between lens elements, an air space between which is not varied in zooming, a sub lens unit comprising a part of a lens unit constituting the rear unit moves in a direction perpendicular to the optical axis to optically compensate image blur, and the following condition (1) is satisfied:

$$0.1 < BF/f_W < 2.0 \quad (1)$$

here, $\omega_W > 72°$, and $FNO_W < 2.9$ where

BF is a back focal length of the entire system at a wide-angle limit, $f_W$ is a focal length of the entire system at a wide-angle limit, $\omega_W$ is a view angle at a wide-angle limit, and $FNO_W$ is an F-number at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, having a plurality of lens units, each lens unit being composed of at least one lens element, in order from an object side to an image side, comprises:

a front unit having negative optical power as a whole, and including a first lens unit located closest to the object side; and a rear unit having positive optical power as a whole, wherein at least the front unit moves along an optical axis in zooming from a wide-angle limit to a telephoto limit at the time of image taking, the first lens unit is composed of at most three lens elements, the rear unit includes a lens unit having an aperture diaphragm between lens elements, an air space between which is not varied in zooming, a sub lens unit comprising a part of a lens unit constituting the rear unit moves in a direction perpendicular to the optical axis to optically compensate image blur, and the following condition (1) is satisfied:

$$0.1 < BF/f_W < 2.0 \quad (1)$$

here, $\omega_W > 72°$, and $FNO_W < 2.9$ where

BF is a back focal length of the entire system at a wide-angle limit, $f_W$ is a focal length of the entire system at a wide-angle limit, $\omega_W$ is a view angle at a wide-angle limit, and $FNO_W$ is an F-number at a wide-angle limit.

According to the present invention, it is possible to provide: a zoom lens system which has, as well as a high performance, a small size and a small F-number at a wide-angle limit, and is satisfactorily adaptable for wide-angle image taking; an imaging device employing the zoom lens system; and a camera employing the imaging device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 6

FIGS. 1, 4, 7, 10, 13, and 16 are lens arrangement diagrams of zoom lens systems according to Embodiments 1, 2, 3, 4, 5, and 6, respectively. Each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an approximately intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of the lens units respectively at a wide-angle limit, a middle position, and a telephoto limit, in order from the top. Therefore, in the part between the wide-angle limit and the middle position, and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Figure 10:
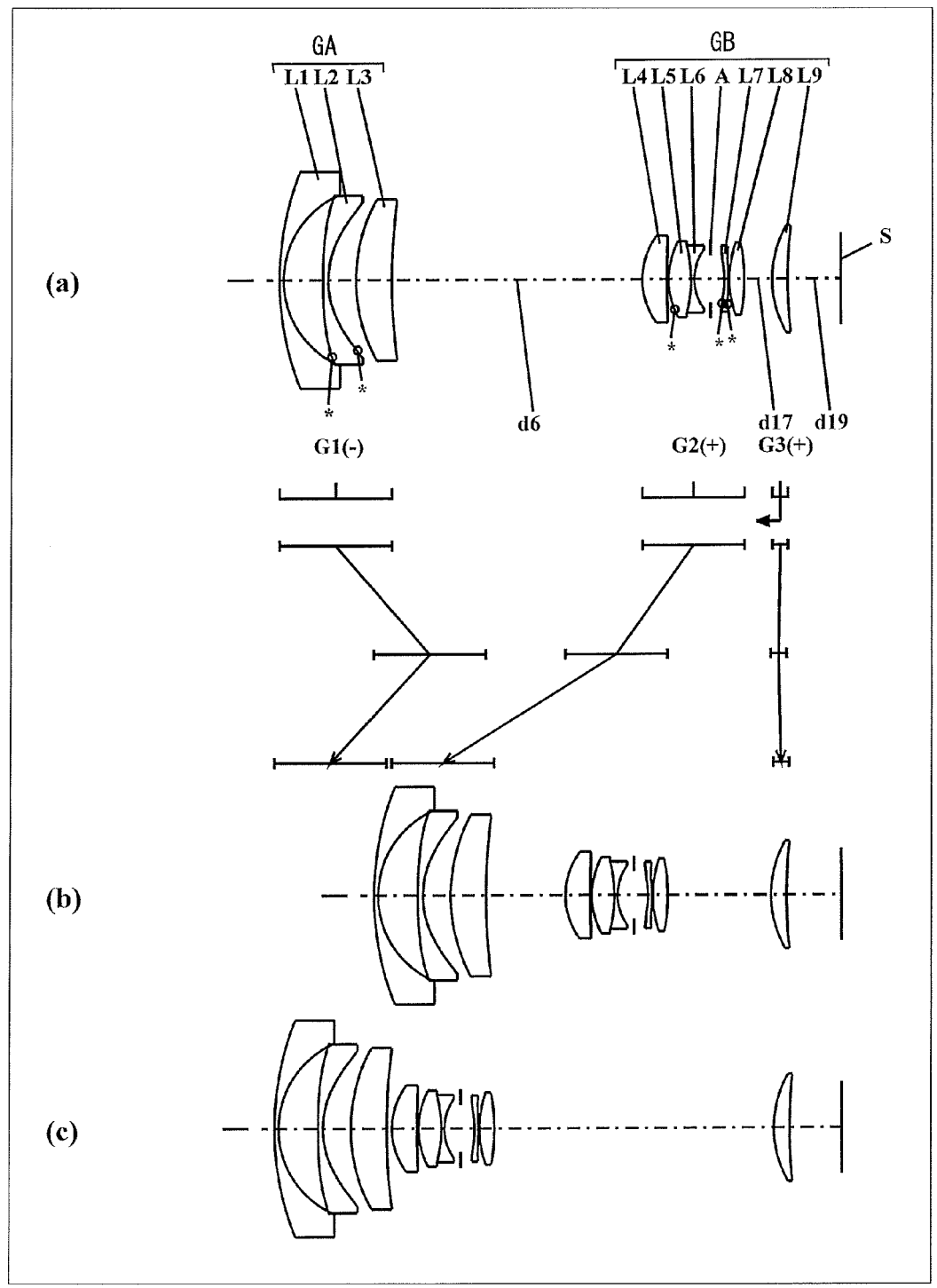
FIG. 10 is a lens arrangement diagram showing an infinity in-focus condition of a zoom lens system according to Embodiment 4 (Example 4)
Figure 11:
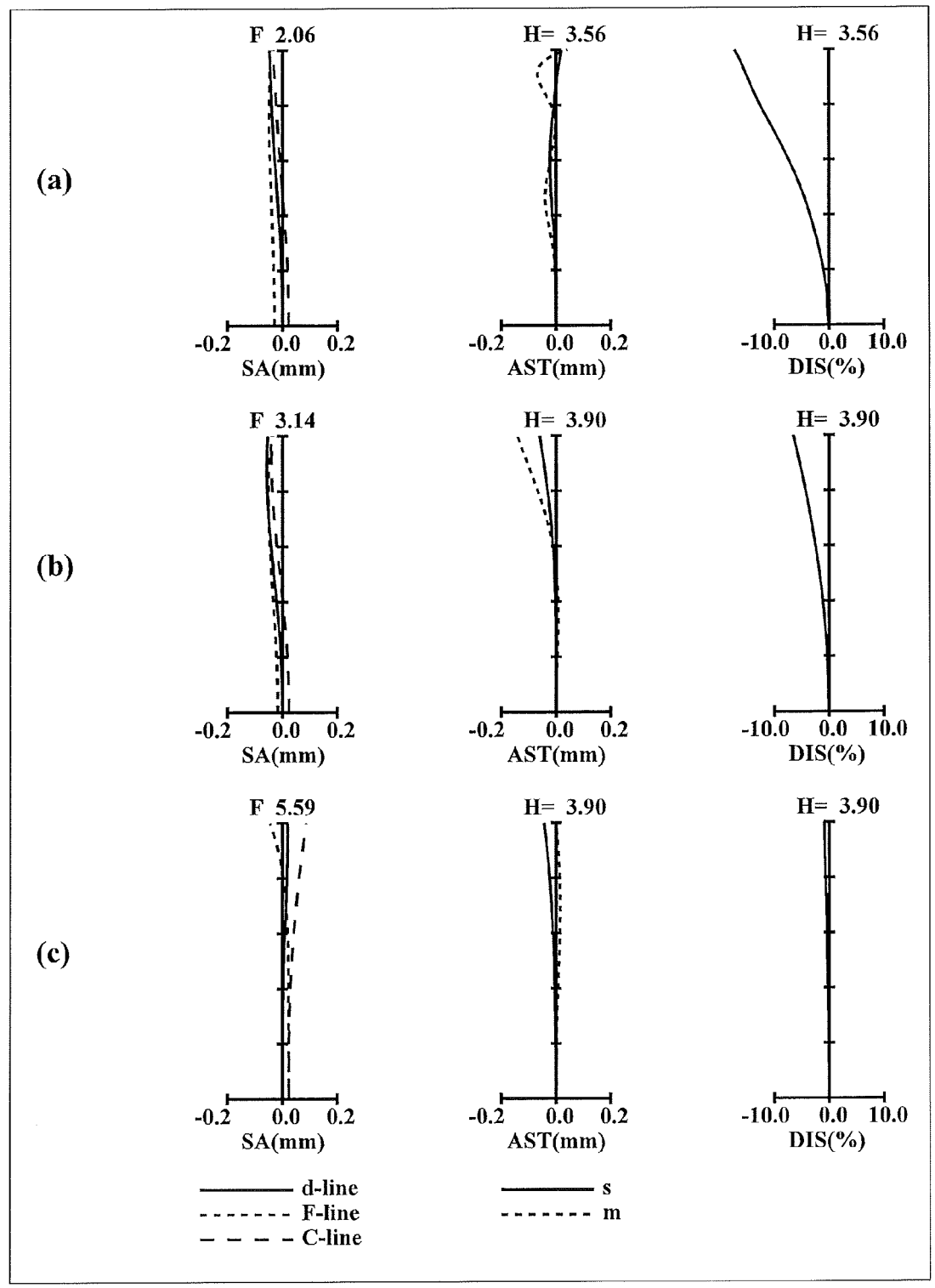
FIG. 11 is a longitudinal aberration diagram of an infinity in-focus condition of a zoom lens system according to Example 4.
Figure 12:
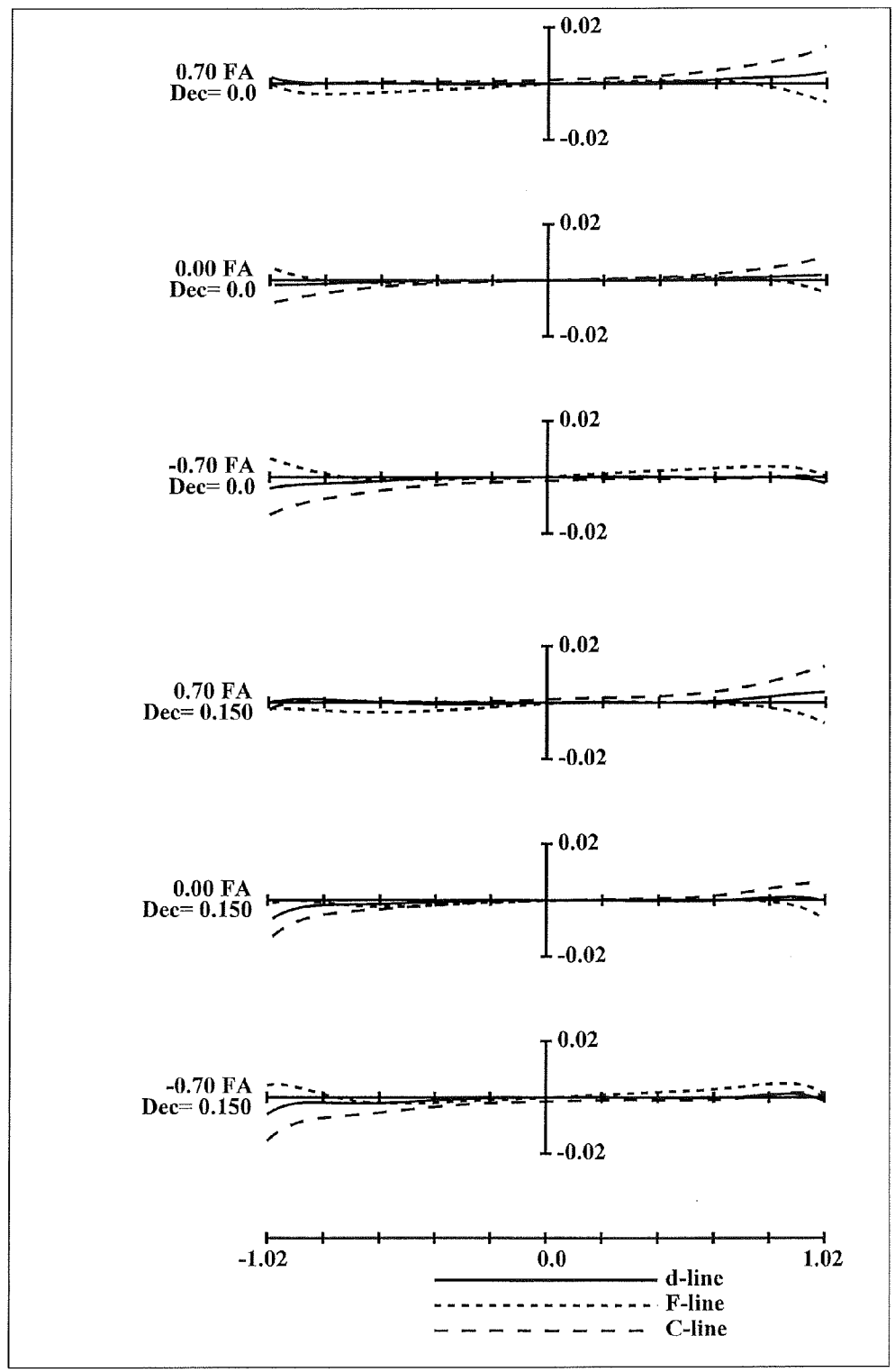
FIG. 12 is a lateral aberration diagram of a zoom lens system according to Example 4 at a telephoto limit in a basic state where image blur compensation is not performed and in a blur compensation state.

In FIGS. 1, 4, 7, 10, 13, and 16, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S. Further, as shown in FIGS. 1, 4, 7, 13, and 16, in a third lens unit G3, an aperture diaphragm A is provided between lens elements, the air space between which is not varied in zooming from a wide-angle limit to a telephoto limit at the time of image taking. Further, as shown in FIG. 10, in a second lens unit G2, an aperture diaphragm A is provided between lens elements, the air space between which is not varied in zooming. In zooming, the aperture diaphragm A moves along the optical axis, in an integrated manner with two lens elements, the air space between which is not varied in zooming, and which are located just on the object side and the image side relative to the aperture diaphragm A, respectively.

The zoom lens system according to Embodiment 1, in order from the object side to the image side, comprises a front unit GA and a rear unit GB. The front unit GA, in order from the object side to the image side, comprises a first lens unit G1 and a second lens unit G2. The rear unit GB, in order from the object side to the image side, comprises a third lens unit G3 and a fourth lens unit G4.

Figure 1:
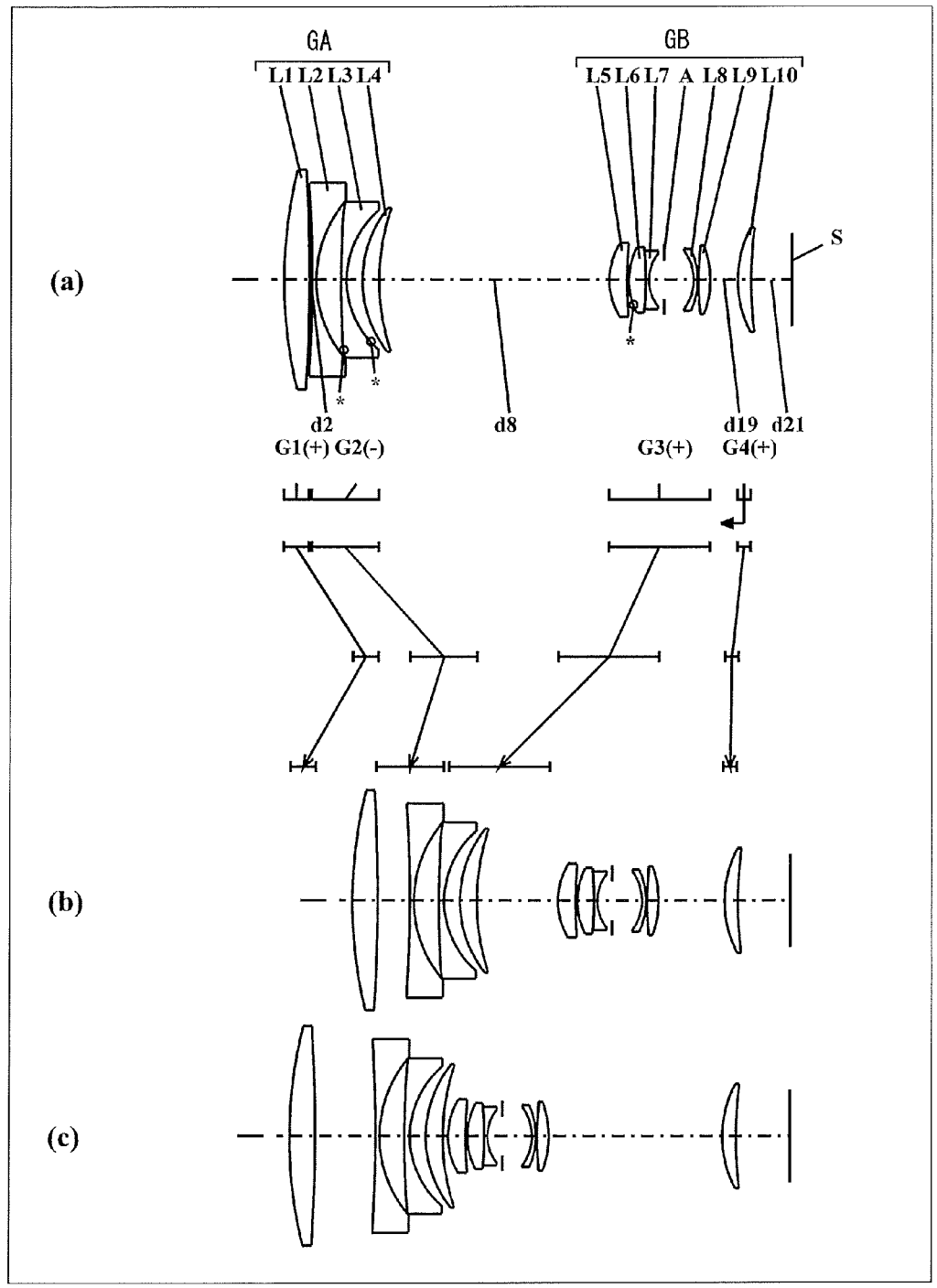
FIG. 1 is a lens arrangement diagram showing an infinity in-focus condition of a zoom lens system according to Embodiment 1 (Example 1)
Figure 2:
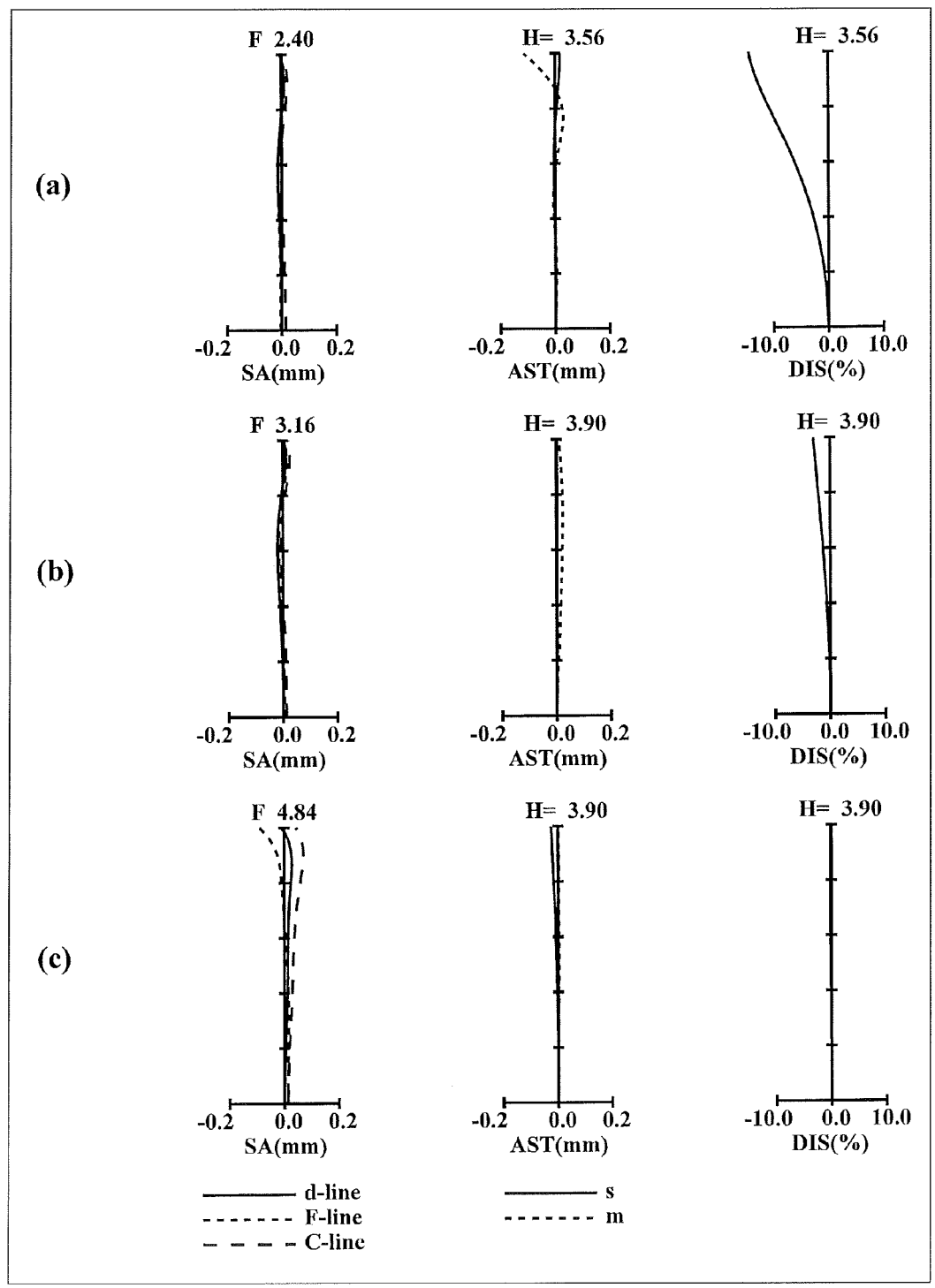
FIG. 2 is a longitudinal aberration diagram of an infinity in-focus condition of a zoom lens system according to Example 1.
Figure 3:
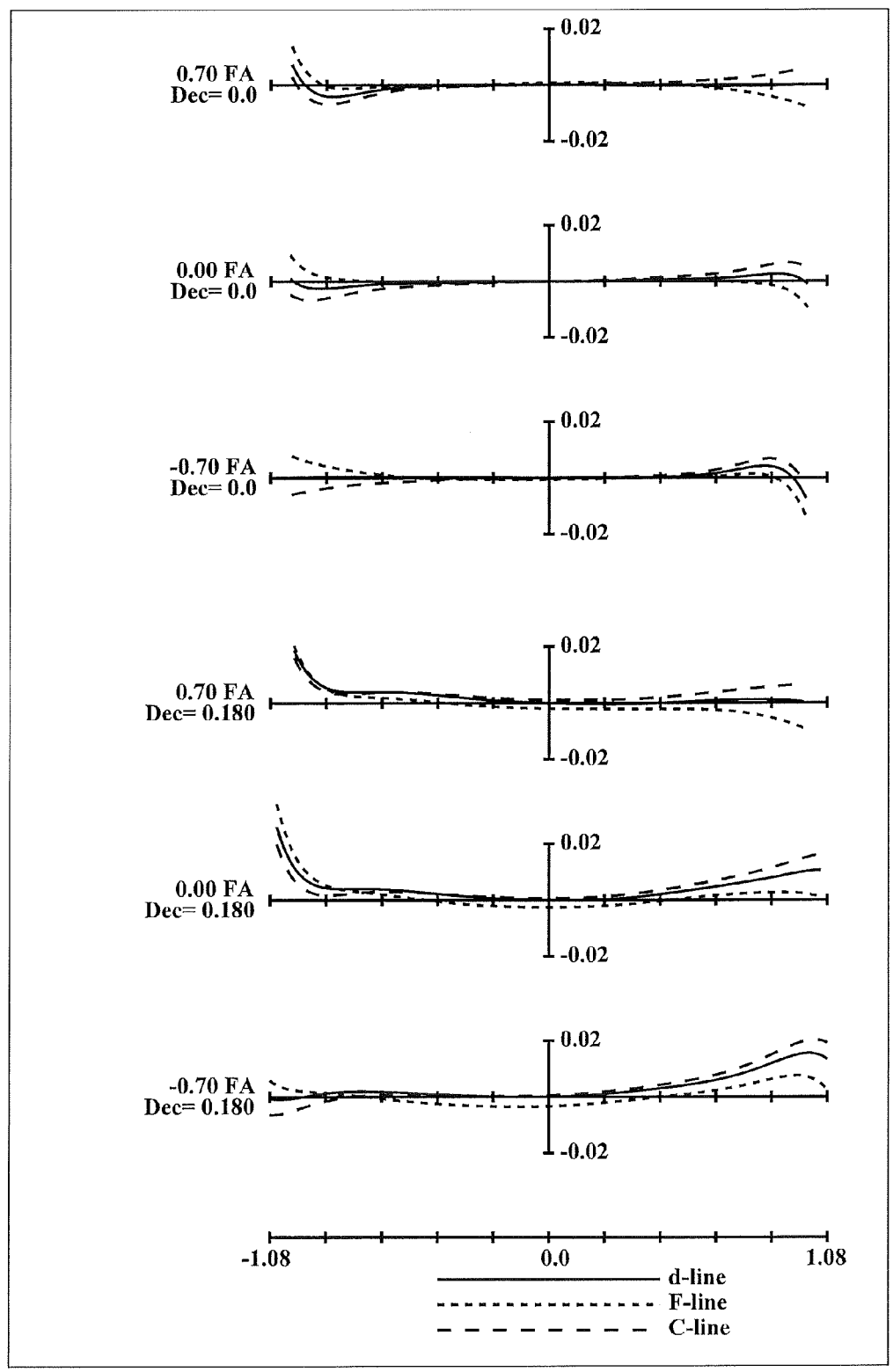
FIG. 3 is a lateral aberration diagram of a zoom lens system according to Example 1 at a telephoto limit in a basic state where image blur compensation is not performed and in a blur compensation state.

As shown in FIG. 1, the first lens unit G1 comprises solely a bi-convex first lens element L1 having positive optical power.

The second lens unit G2, in order from the object side to the image side, comprises a bi-concave second lens element L2 having negative optical power, a negative meniscus third lens element L3 having negative optical power and a convex surface facing the object side, and a positive meniscus fourth lens element L4 having positive optical power and a convex surface facing the object side. The third lens element L3 has two aspheric surfaces.

The third lens unit G3, in order from the object side to the image side, comprises a positive meniscus fifth lens element L5 having positive optical power and a convex surface facing the object side, a bi-convex sixth lens element L6 having positive optical power, a bi-concave seventh lens element L7 having negative optical power, an aperture diaphragm A, a negative meniscus eighth lens element L8 having negative optical power and a convex surface facing the image side, and a bi-convex ninth lens element L9 having positive optical power. Among these, the sixth lens element L6 and the seventh lens element L7 are cemented with each other. The sixth lens element L6 has an aspheric object side surface.

The fourth lens unit G4 comprises solely a positive meniscus tenth lens element L10 having positive optical power and a convex surface facing the object side.

In the zoom lens system according to Embodiment 1, in zooming from a wide-angle limit to a telephoto limit at the time of image taking, the first lens unit G1 slightly moves to the image side with locus of a convex to the image side, the second lens unit G2 moves to the image side with locus of a convex to the image side, the third lens unit G3 moves monotonically to the object side, and the fourth lens unit G4 moves monotonically to the object side. That is, in zooming, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the image surface S should increase.

Further, in focusing from an infinity in-focus condition to a close-object in-focus condition, the fourth lens unit G4 moves to the object side along the optical axis.

In the zoom lens system according to Embodiment 1, a sub lens unit consisting of a part of the third lens unit G3, i.e., the fifth lens element L5, the sixth lens element L6, and the seventh lens element L7, is moved in a direction perpendicular to the optical axis, and thereby image point movement caused by vibration of the entire system can be compensated, that is, image blur caused by hand blurring, vibration and the like can be optically compensated.

In the zoom lens system according to Embodiment 1, or in the zoom lens systems according to Embodiments 2 to 6 described later, the sub lens unit is moved in the direction perpendicular to the optical axis when compensating the image point movement caused by vibration of the entire system. Thereby, image blur can be compensated in a state that size increase in the entire zoom lens system is suppressed to realize a compact construction and that excellent imaging characteristics such as small decentering coma aberration and small decentering astigmatism are maintained.

In the present specification, a sub lens unit consisting of a part of a lens unit indicates, when the lens unit comprises a plurality of lens elements, any one lens element or a plurality of adjacent lens elements among the plurality of lens elements.

The zoom lens system according to Embodiment 2, in order from the object side to the image side, comprises a front unit GA and a rear unit GB. The front unit GA, in order from the object side to the image side, comprises a first lens unit G1 and a second lens unit G2. The rear unit GB, in order from the object side to the image side, comprises a third lens unit G3 and a fourth lens unit G4.

Figure 4:
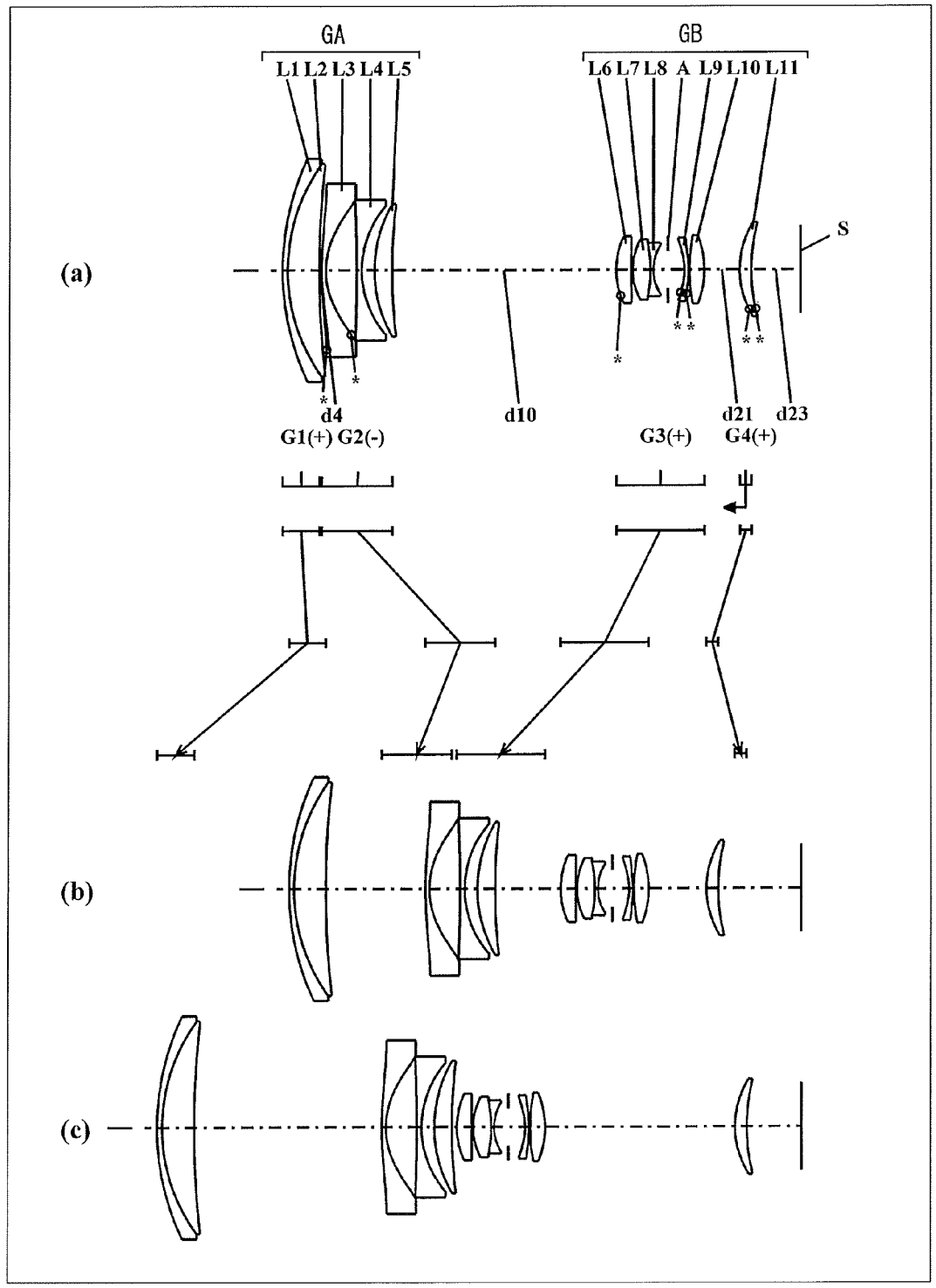
FIG. 4 is a lens arrangement diagram showing an infinity in-focus condition of a zoom lens system according to Embodiment 2 (Example 2)
Figure 5:
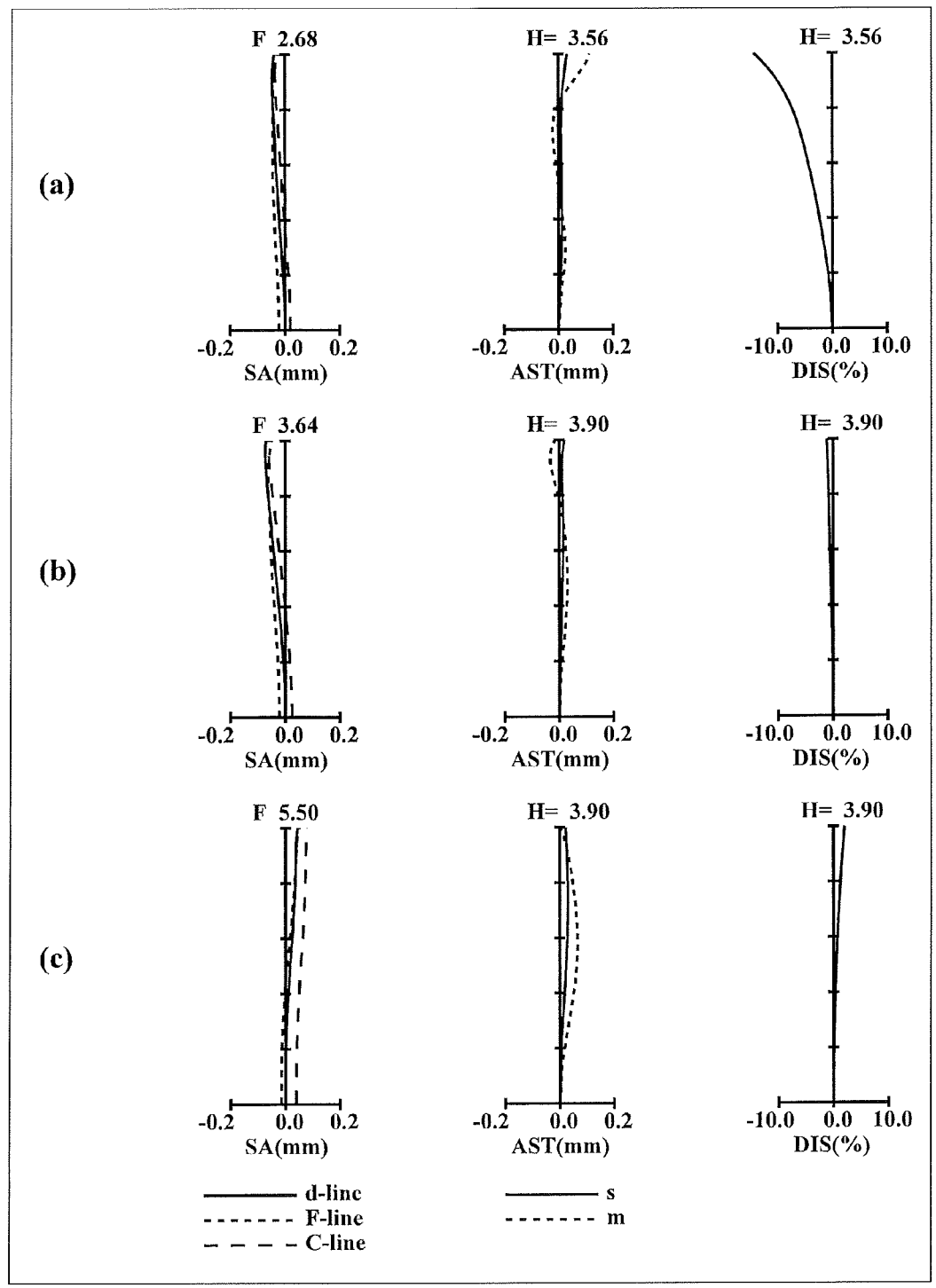
FIG. 5 is a longitudinal aberration diagram of an infinity in-focus condition of a zoom lens system according to Example 2.
Figure 6:
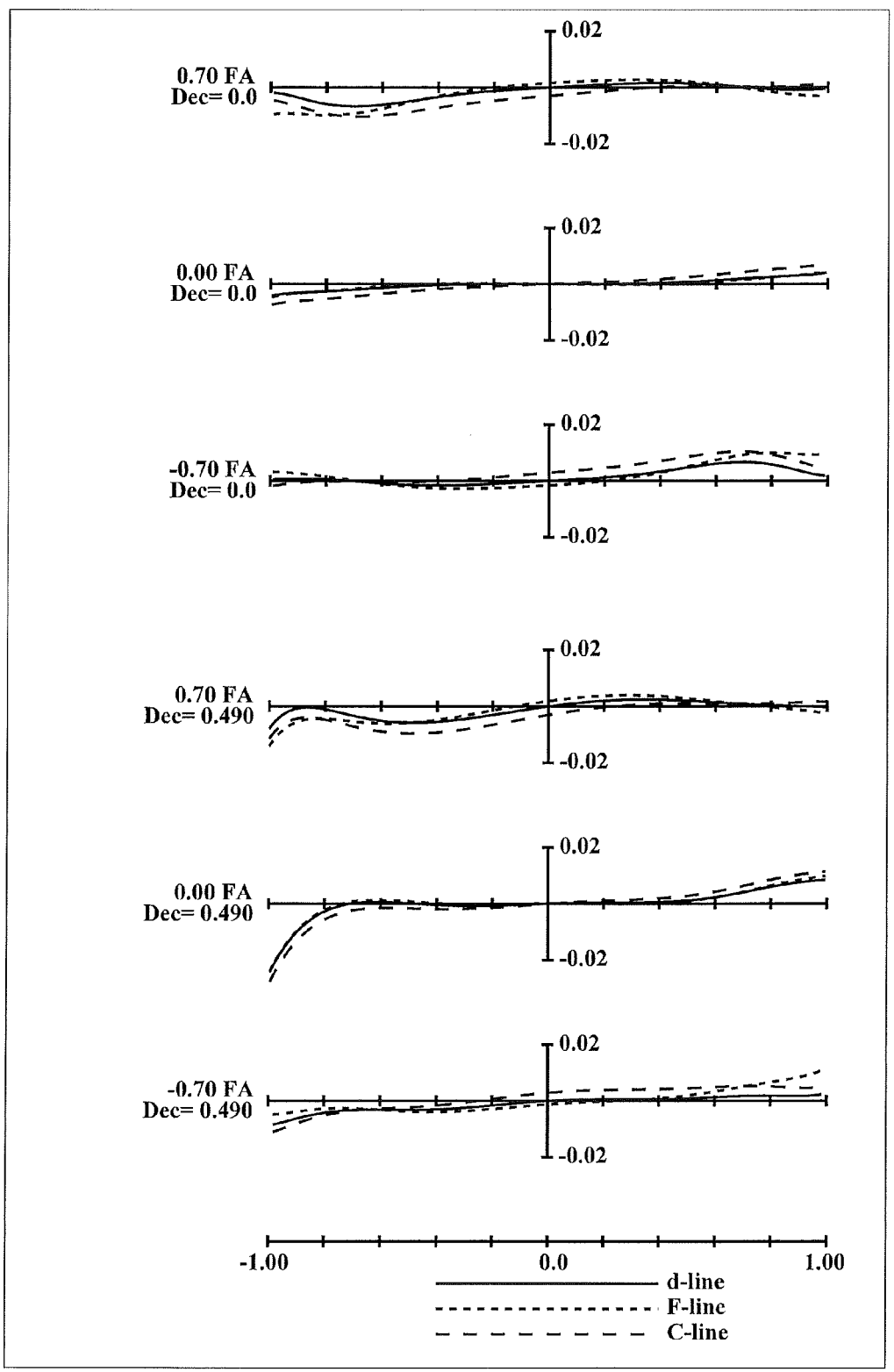
FIG. 6 is a lateral aberration diagram of a zoom lens system according to Example 2 at a telephoto limit in a basic state where image blur compensation is not performed and in a blur compensation state.

As shown in FIG. 4, the first lens unit G1, in order from the object side to the image side, comprises a negative meniscus first lens element L1 having negative optical power and a convex surface facing the object side, and a positive meniscus second lens element L2 having positive optical power and a convex surface facing the object side.

The second lens unit G2, in order from the object side to the image side, comprises a negative meniscus third lens element L3 having negative optical power and a convex surface facing the object side, a bi-concave fourth lens element L4 having negative optical power, and a positive meniscus fifth lens element L5 having positive optical power and a convex surface facing the object side. The third lens element L3 has two aspheric surfaces.

The third lens unit G3, in order from the object side to the image side, comprises a positive meniscus sixth lens element L6 having positive optical power and a convex surface facing the object side, a bi-convex seventh lens element L7 having positive optical power, a bi-concave eighth lens element L8 having negative optical power, an aperture diaphragm A, a negative meniscus ninth lens element L9 having negative optical power and a convex surface facing the image side, and a bi-convex tenth lens element L10 having positive optical power. Among these, the seventh lens element L7 and the eighth lens element L8 are cemented with each other. The sixth lens element L6 has an aspheric object side surface, and the ninth lens element L9 has two aspheric surfaces.

The fourth lens unit G4 comprises solely a positive meniscus eleventh lens element L11 having positive optical power and a convex surface facing the object side. The eleventh lens element L11 has two aspheric surfaces.

In the zoom lens system according to Embodiment 2, in zooming from a wide-angle limit to a telephoto limit at the time of image taking, the first lens unit G1 moves to the object side with locus of a convex to the image side, the second lens unit G2 moves to the image side with locus of a convex to the image side, the third lens unit G3 moves monotonically to the object side, and the fourth lens unit G4 slightly moves to the object side with locus of a convex to the object side. That is, in zooming, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the image surface S should increase.

Further, in focusing from an infinity in-focus condition to a close-object in-focus condition, the fourth lens unit G4 moves to the object side along the optical axis.

In the zoom lens system according to Embodiment 2, a sub lens unit consisting of a part of the third lens unit G3, i.e., the ninth lens element L9 and the tenth lens element L10, is moved in a direction perpendicular to the optical axis, and thereby image point movement caused by vibration of the entire system can be compensated, that is, image blur caused by hand blurring, vibration and the like can be optically compensated.

The zoom lens system according to Embodiment 3, in order from the object side to the image side, comprises a front unit GA and a rear unit GB. The front unit GA, in order from the object side to the image side, comprises a first lens unit G1 and a second lens unit G2. The rear unit GB, in order from the object side to the image side, comprises a third lens unit G3 and a fourth lens unit G4.

Figure 7:
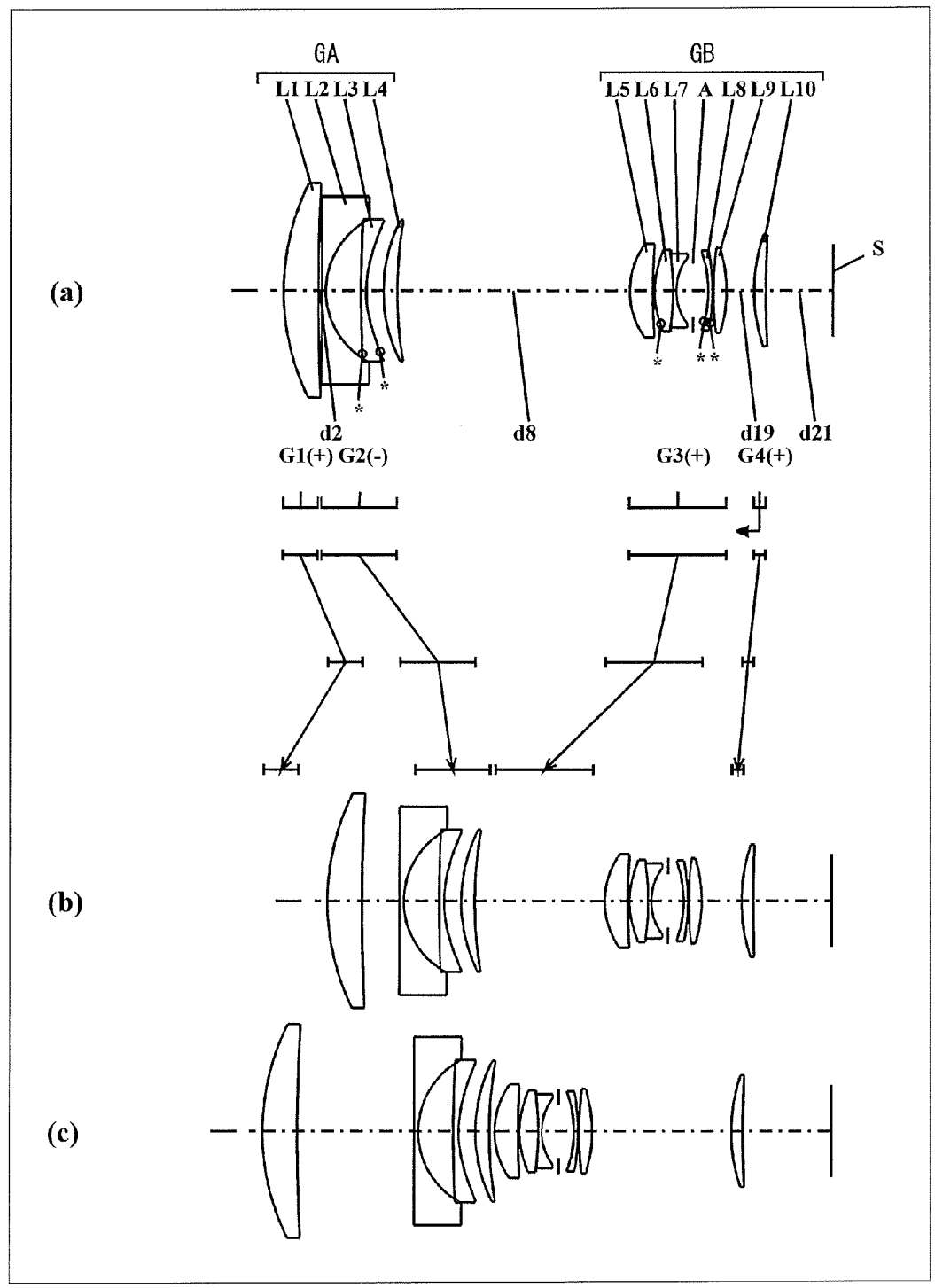
FIG. 7 is a lens arrangement diagram showing an infinity in-focus condition of a zoom lens system according to Embodiment 3 (Example 3)
Figure 8:
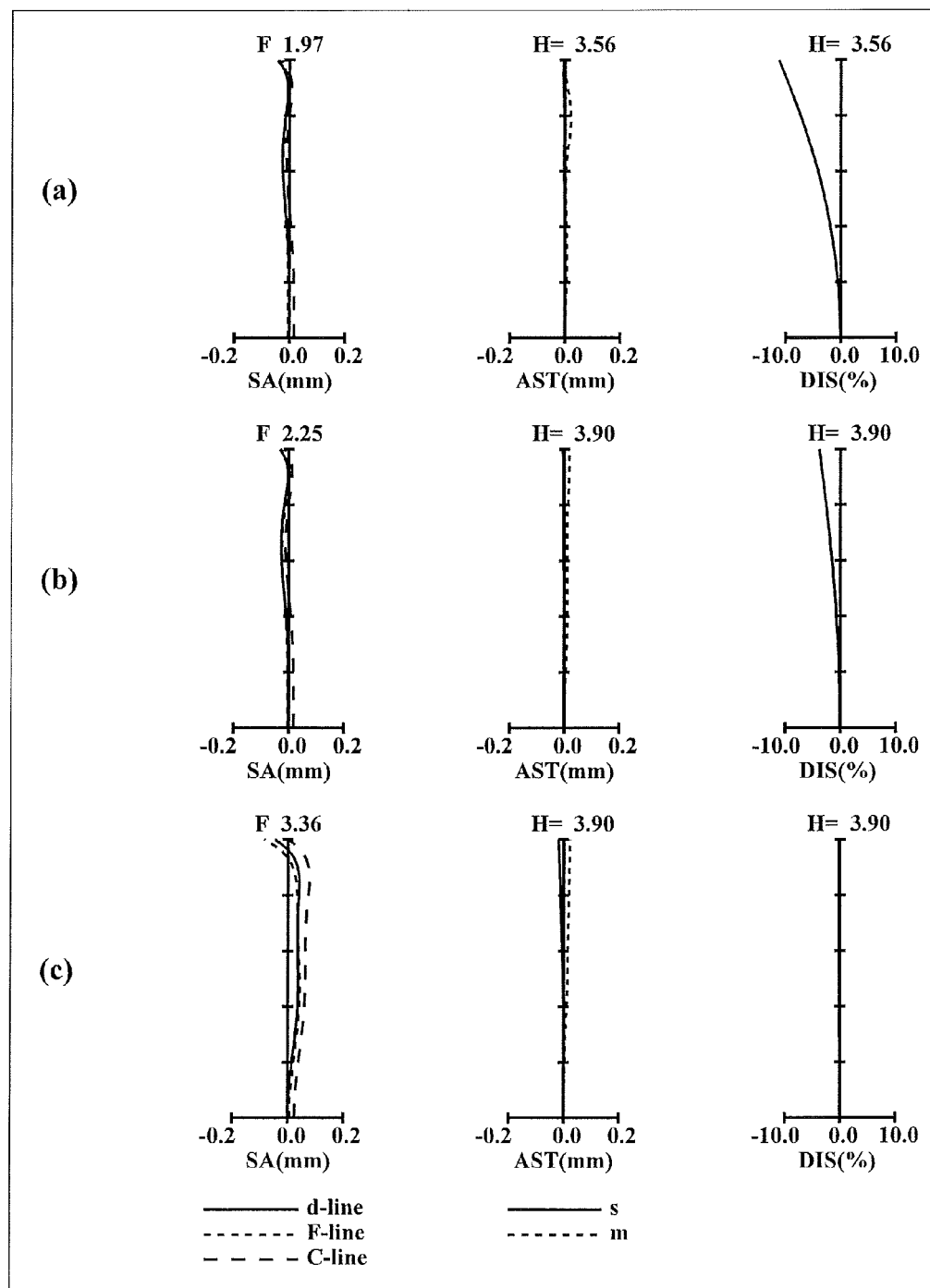
FIG. 8 is a longitudinal aberration diagram of an infinity in-focus condition of a zoom lens system according to Example 3.
Figure 9:
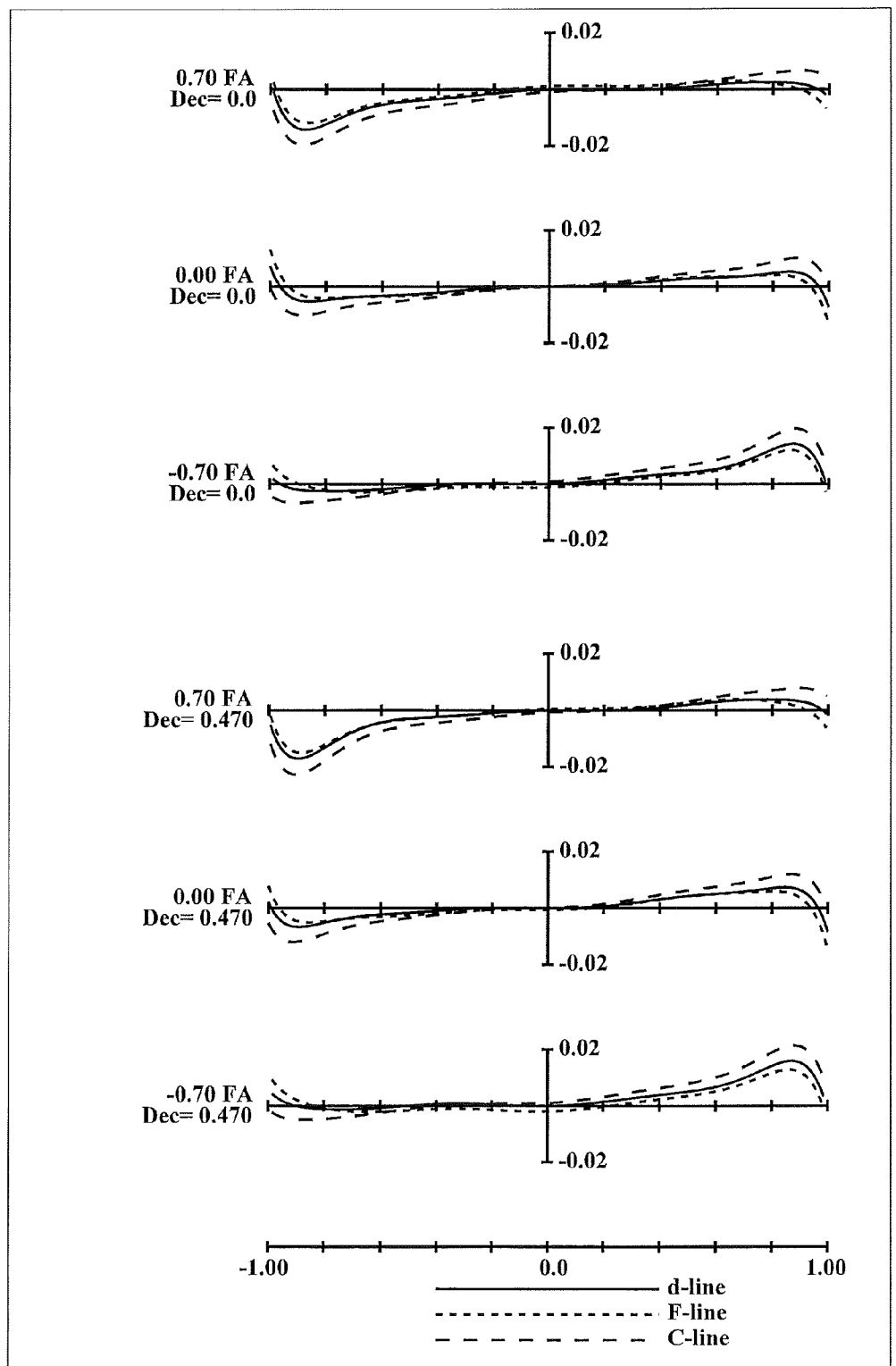
FIG. 9 is a lateral aberration diagram of a zoom lens system according to Example 3 at a telephoto limit in a basic state where image blur compensation is not performed and in a blur compensation state.

As shown in FIG. 7, the first lens unit G1 comprises solely a positive meniscus first lens element L1 having positive optical power and a convex surface facing the object side.

The second lens unit G2, in order from the object side to the image side, comprises a bi-concave second lens element L2 having negative optical power, a negative meniscus third lens element L3 having negative optical power and a convex surface facing the object side, and a positive meniscus fourth lens element L4 having positive optical power and a convex surface facing the object side. The third lens element L3 has two aspheric surfaces.

The third lens unit G3, in order from the object side to the image side, comprises a positive meniscus fifth lens element L5 having positive optical power and a convex surface facing the object side, a bi-convex sixth lens element L6 having positive optical power, a bi-concave seventh lens element L7 having negative optical power, an aperture diaphragm A, a negative meniscus eighth lens element L8 having negative optical power and a convex surface facing the image side, and a bi-convex ninth lens element L9 having positive optical power. Among these, the sixth lens element L6 and the seventh lens element L7 are cemented with each other. The sixth lens element L6 has an aspheric object side surface, and the eighth lens element L8 has two aspheric surfaces.

The fourth lens unit G4 comprises solely a positive meniscus tenth lens element L10 having positive optical power and a convex surface facing the object side.

In the zoom lens system according to Embodiment 3, in zooming from a wide-angle limit to a telephoto limit at the time of image taking, the first lens unit G1 moves to the object side with locus of a convex to the image side, the second lens unit G2 moves monotonically to the image side, the third lens unit G3 moves monotonically to the object side, and the fourth lens unit G4 moves monotonically to the object side. That is, in zooming, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the image surface S should increase.

Further, in focusing from an infinity in-focus condition to a close-object in-focus condition, the fourth lens unit G4 moves to the object side along the optical axis.

In the zoom lens system according to Embodiment 3, a sub lens unit consisting of a part of the third lens unit G3, i.e., the eighth lens element L8 and the ninth lens element L9, is moved in a direction perpendicular to the optical axis, and thereby image point movement caused by vibration of the entire system can be compensated, that is, image blur caused by hand blurring, vibration and the like can be optically compensated.

The zoom lens system according to Embodiment 4, in order from the object side to the image side, comprises a front unit GA and a rear unit GB. The front unit GA comprises solely a first lens unit G1. The rear unit GB, in order from the object side to the image side, comprises a second lens unit G2 and a third lens unit G3.

As shown in FIG. 10, the first lens unit G1, in order from the object side to the image side, comprises a negative meniscus first lens element L1 having negative optical power and a convex surface facing the object side, a negative meniscus second lens element L2 having negative optical power and a convex surface facing the object side, and a positive meniscus third lens element L3 having positive optical power and a convex surface facing the object side. The second lens element L2 has two aspheric surfaces.

The second lens unit G2, in order from the object side to the image side, comprises a positive meniscus fourth lens element L4 having positive optical power and a convex surface facing the object side, a bi-convex fifth lens element L5 having positive optical power, a bi-concave sixth lens element L6 having negative optical power, an aperture diaphragm A, a negative meniscus seventh lens element L7 having negative optical power and a convex surface facing the image side, and a bi-convex eighth lens element L8 having positive optical power. Among these, the fifth lens element L5 and the sixth lens element L6 are cemented with each other. The fifth lens element L5 has an aspheric object side surface, and the seventh lens element L7 has two aspheric surfaces.

The third lens unit G3 comprises solely a positive meniscus ninth lens element L9 having positive optical power and a convex surface facing the object side.

In the zoom lens system according to Embodiment 4, in zooming from a wide-angle limit to a telephoto limit at the time of image taking, the first lens unit G1 moves to the object side with locus of a convex to the image side, the second lens unit G2 moves monotonically to the object side, and the third lens unit G3 moves to the image side with locus of a convex to the object side. That is, in zooming, the individual lens units move along the optical axis such that the interval between the first lens unit G1 and the second lens unit G2 should decrease, the interval between the second lens unit G2 and the third lens unit G3 should increase, and the interval between the third lens unit G3 and the image surface S should decrease.

Further, in focusing from an infinity in-focus condition to a close-object in-focus condition, the third lens unit G3 moves to the object side along the optical axis.

In the zoom lens system according to Embodiment 4, a sub lens unit consisting of a part of the second lens unit G2, i.e., the seventh lens element L7 and the eighth lens element L8, is moved in a direction perpendicular to the optical axis, and thereby image point movement caused by vibration of the entire system can be compensated, that is, image blur caused by hand blurring, vibration and the like can be optically compensated.

The zoom lens system according to Embodiment 5, in order from the object side to the image side, comprises a front unit GA and a rear unit GB. The front unit GA, in order from the object side to the image side, comprises a first lens unit G1 and a second lens unit G2. The rear unit GB, in order from the object side to the image side, comprises a third lens unit G3 and a fourth lens unit G4.

Figure 13:
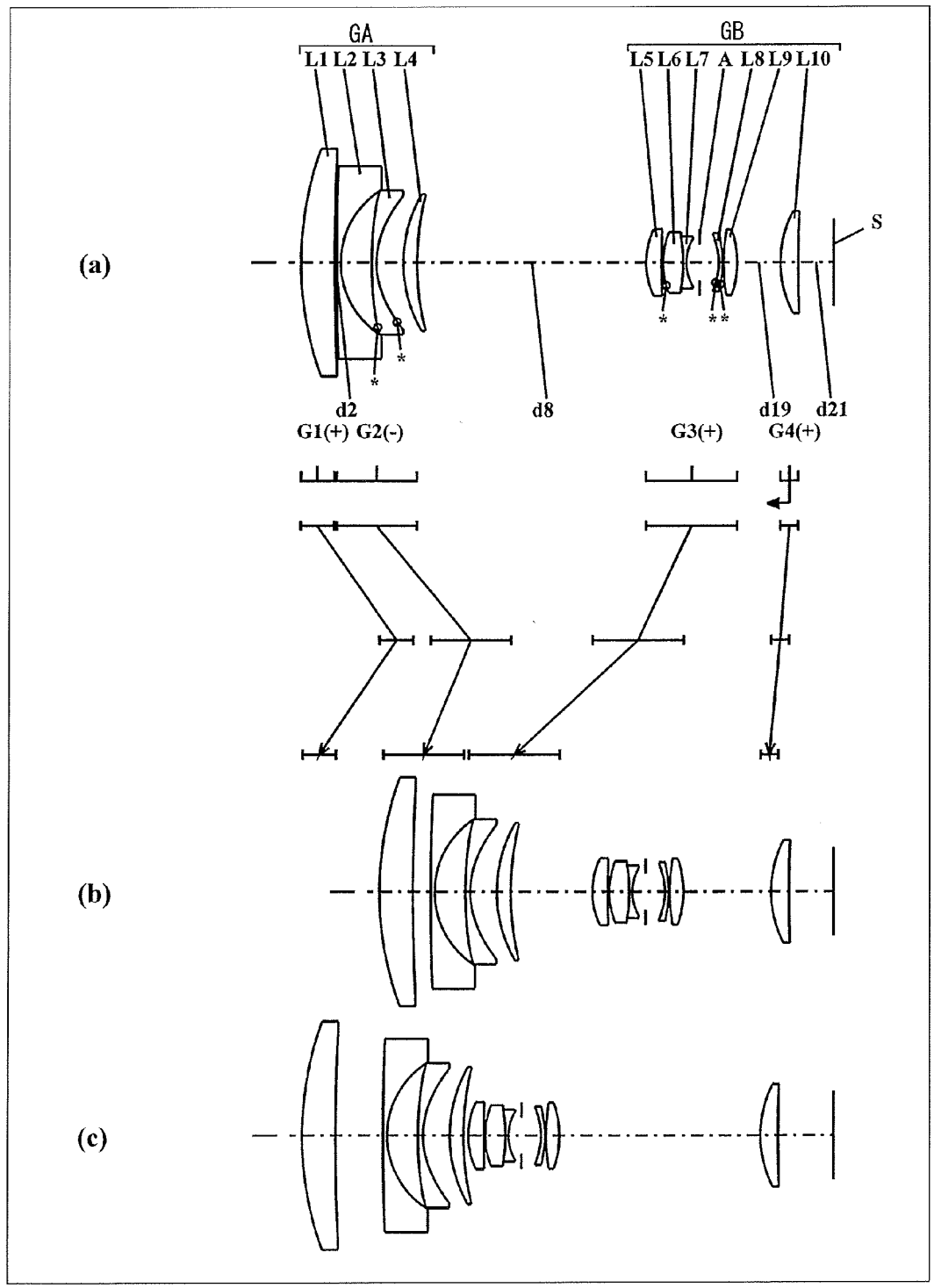
FIG. 13 is a lens arrangement diagram showing an infinity in-focus condition of a zoom lens system according to Embodiment 5 (Example 5)
Figure 14:
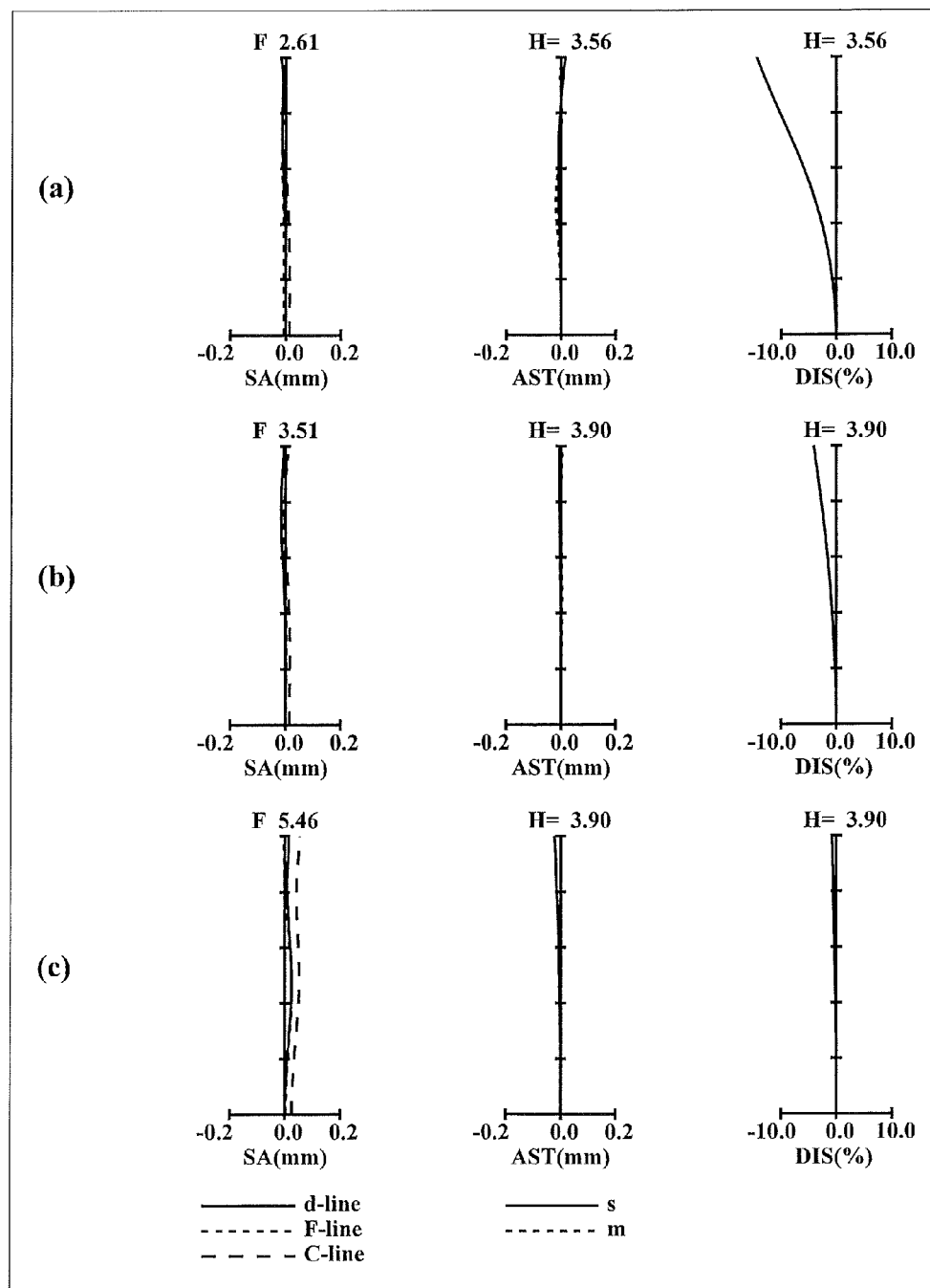
FIG. 14 is a longitudinal aberration diagram of an infinity in-focus condition of a zoom lens system according to Example 5.
Figure 15:
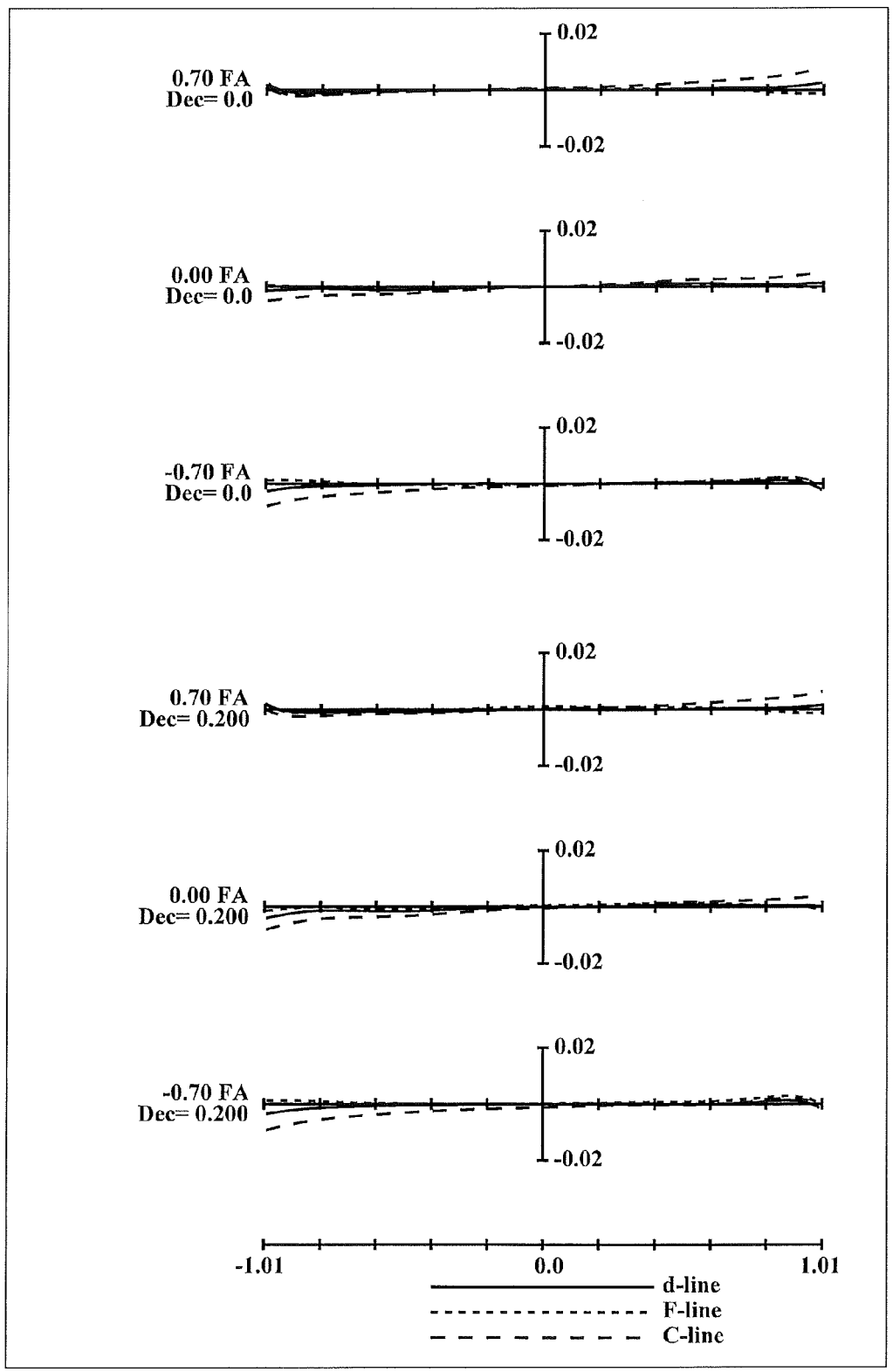
FIG. 15 is a lateral aberration diagram of a zoom lens system according to Example 5 at a telephoto limit in a basic state where image blur compensation is not performed and in a blur compensation state.

As shown in FIG. 13, the first lens unit G1 comprises solely a positive meniscus first lens element L1 having positive optical power and a convex surface facing the object side.

The second lens unit G2, in order from the object side to the image side, comprises a negative meniscus second lens element L2 having negative optical power and a convex surface facing the object side, a negative meniscus third lens element L3 having negative optical power and a convex surface facing the object side, and a positive meniscus fourth lens element L4 having positive optical power and a convex surface facing the object side. The third lens element L3 has two aspheric surfaces.

The third lens unit G3, in order from the object side to the image side, comprises a positive meniscus fifth lens element L5 having positive optical power and a convex surface facing the object side, a bi-convex sixth lens element L6 having positive optical power, a bi-concave seventh lens element L7 having negative optical power, an aperture diaphragm A, a negative meniscus eighth lens element L8 having negative optical power and a convex surface facing the image side, and a bi-convex ninth lens element L9 having positive optical power. Among these, the sixth lens element L6 and the seventh lens element L7 are cemented with each other. The sixth lens element L6 has an aspheric object side surface, and the eighth lens element L8 has two aspheric surfaces.

The fourth lens unit G4 comprises solely a positive meniscus tenth lens element L10 having positive optical power and a convex surface facing the object side.

In the zoom lens system according to Embodiment 5, in zooming from a wide-angle limit to a telephoto limit at the time of image taking, the first lens unit G1 slightly moves to the image side with locus of a convex to the image side, the second lens unit G2 moves to the image side with locus of a convex to the image side, the third lens unit G3 moves monotonically to the object side, and the fourth lens unit G4 moves monotonically to the object side. That is, in zooming, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the image surface S should increase.

Further, in focusing from an infinity in-focus condition to a close-object in-focus condition, the fourth lens unit G4 moves to the object side along the optical axis.

In the zoom lens system according to Embodiment 5, a sub lens unit consisting of a part of the third lens unit G3, i.e., the eighth lens element L8 and the ninth lens element L9, is moved in a direction perpendicular to the optical axis, and thereby image point movement caused by vibration of the entire system can be compensated, that is, image blur caused by hand blurring, vibration and the like can be optically compensated.

The zoom lens system according to Embodiment 6, in order from the object side to the image side, comprises a front unit GA and a rear unit GB. The front unit GA, in order from the object side to the image side, comprises a first lens unit G1 and a second lens unit G2. The rear unit GB, in order from the object side to the image side, comprises a third lens unit G3, a fourth lens unit G4, and a fifth lens unit G5.

Figure 16:
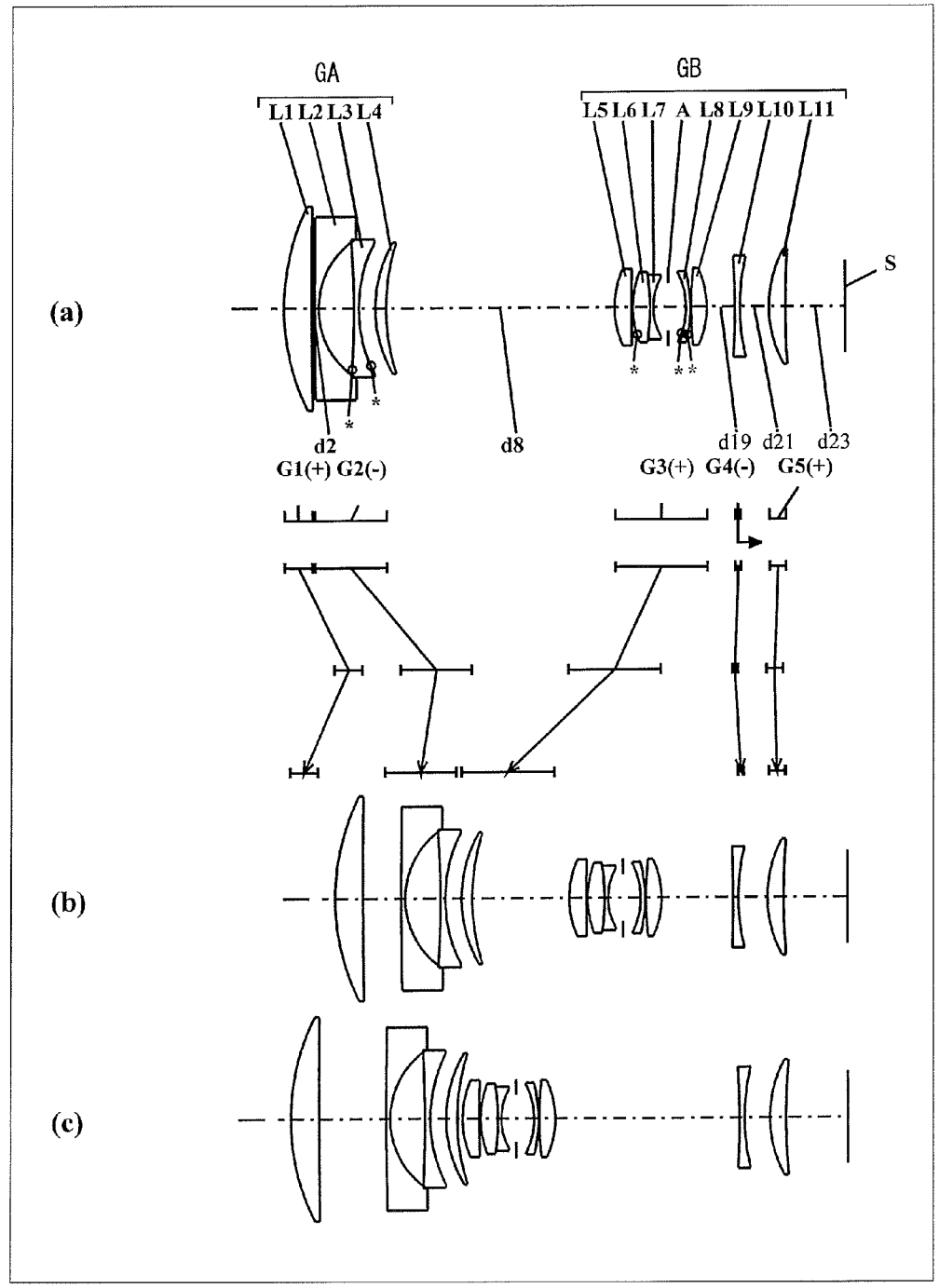
FIG. 16 is a lens arrangement diagram showing an infinity in-focus condition of a zoom lens system according to Embodiment 6 (Example 6)
Figure 17:
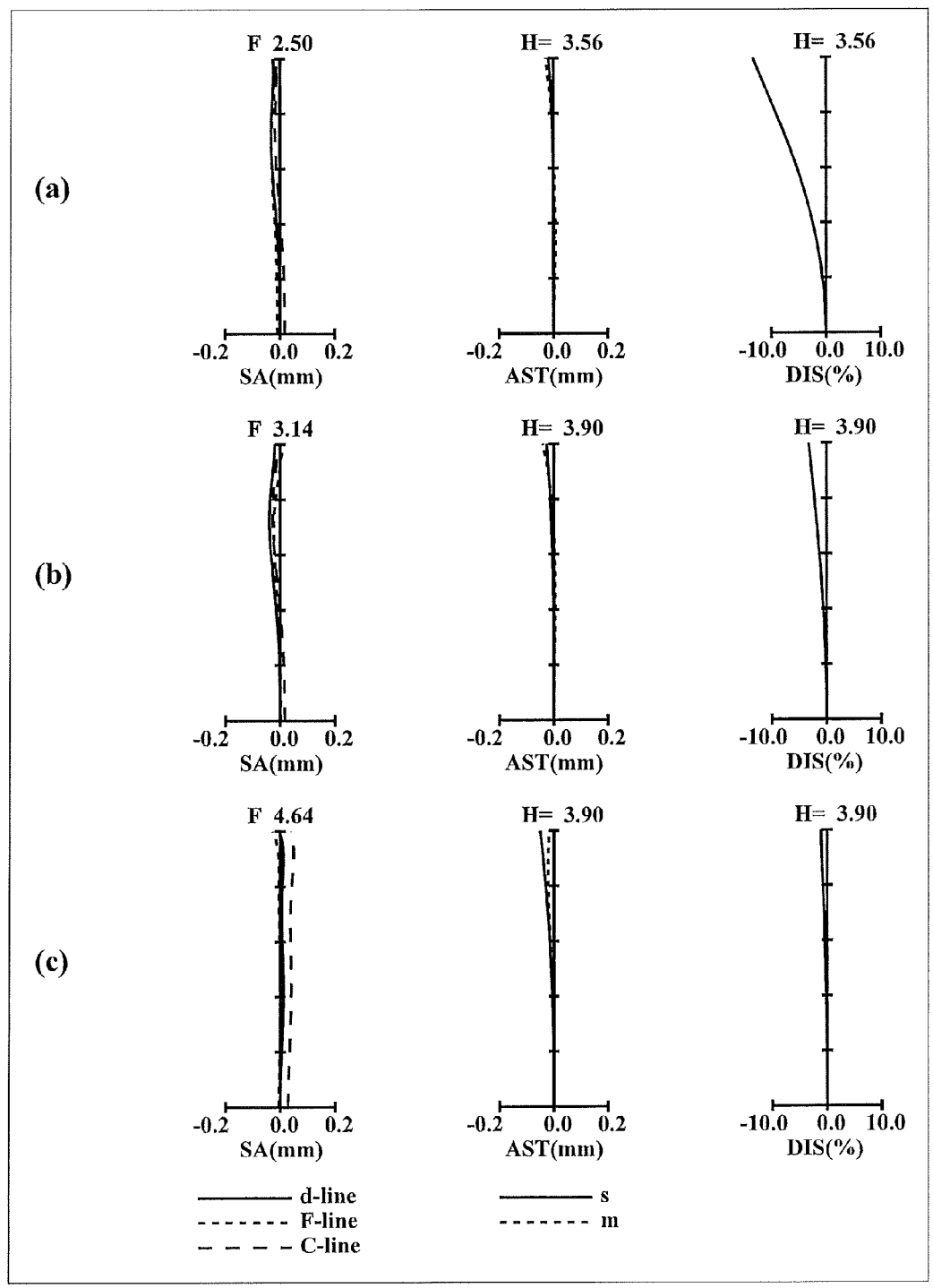
FIG. 17 is a longitudinal aberration diagram of an infinity in-focus condition of a zoom lens system according to Example 6.
Figure 18:
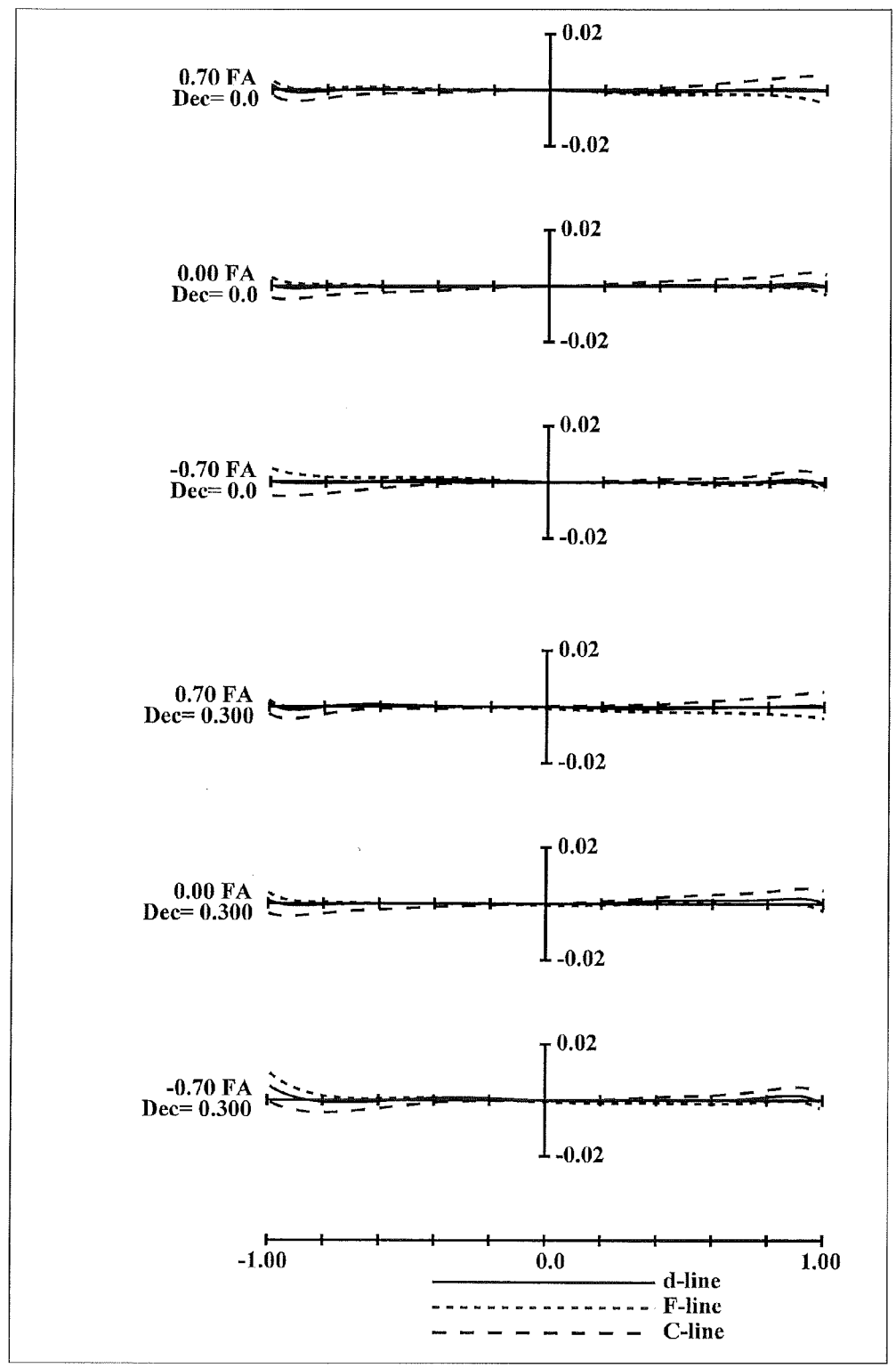
FIG. 18 is a lateral aberration diagram of a zoom lens system according to Example 6 at a telephoto limit in a basic state where image blur compensation is not performed and in a blur compensation state.

As shown in FIG. 16, the first lens unit G1 comprises solely a positive meniscus first lens element L1 having positive optical power and a convex surface facing the object side.

The second lens unit G2, in order from the object side to the image side, comprises a negative meniscus second lens element L2 having negative optical power and a convex surface facing the object side, a bi-concave third lens element L3 having negative optical power, and a positive meniscus fourth lens element L4 having positive optical power and a convex surface facing the object side. The third lens element L3 has two aspheric surfaces.

The third lens unit G3, in order from the object side to the image side, comprises a positive meniscus fifth lens element L5 having positive optical power and a convex surface facing the object side, a bi-convex sixth lens element L6 having positive optical power, a bi-concave seventh lens element L7 having negative optical power, an aperture diaphragm A, a negative meniscus eighth lens element L8 having negative optical power and a convex surface facing the image side, and a bi-convex ninth lens element L9 having positive optical power. Among these, the sixth lens element L6 and the seventh lens element L7 are cemented with each other. The sixth lens element L6 has an aspheric object side surface, and the eighth lens element L8 has two aspheric surfaces.

The fourth lens unit G4 comprises solely a bi-concave tenth lens element L10 having negative optical power.

The fifth lens unit G5 comprises solely a positive meniscus eleventh lens element L11 having positive optical power and a convex surface facing the object side.

In the zoom lens system according to Embodiment 6, in zooming from a wide-angle limit to a telephoto limit at the time of image taking, the first lens unit G1 moves to the image side with locus of a convex to the image side, the second lens unit G2 moves to the image side with locus of a convex to the image side, the third lens unit G3 moves monotonically to the object side, the fourth lens unit G4 slightly moves to the image side with locus of a convex to the object side, and the fifth lens unit G5 slightly moves to the object side with locus of a convex to the object side. That is, in zooming, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, the interval between the fourth lens unit G4 and the fifth lens unit G5 should decrease, and the interval between the fifth lens unit G5 and the image surface S should increase.

Further, in focusing from an infinity in-focus condition to a close-object in-focus condition, the fourth lens unit G4 moves to the image side along the optical axis.

In the zoom lens system according to Embodiment 6, a sub lens unit consisting of a part of the third lens unit G3, i.e., the eighth lens element L8 and the ninth lens element L9, is moved in a direction perpendicular to the optical axis, and thereby image point movement caused by vibration of the entire system can be compensated, that is, image blur caused by hand blurring, vibration and the like can be optically compensated.

In the zoom lens systems according to Embodiments 1 to 6, the front unit having negative optical power as a whole and the rear unit having positive optical power as a whole are provided with, in order from the object side to the image side. In zooming from a wide-angle limit to a telephoto limit at the time of image taking, at least the front unit moves along the optical axis. The first lens unit, which is located closest to the object side in the front unit, is composed of at most three lens elements. The rear unit includes a lens unit in which an aperture diaphragm is arranged between lens elements, the air space between which is not varied during zooming. Therefore, the diameters of the lens elements located just on the object side and the image side relative to the aperture diaphragm, respectively, can be reduced.

In particular, such reduction in the diameters of the lens elements located just on the object side and the image side relative to the aperture diaphragm, respectively, is effective in reducing the diameters of the lens elements constituting the lens unit which moves in an integrated manner with the aperture diaphragm during zooming.

Since the diameters of the lens elements constituting the rear unit are smaller than the diameters of the lens elements constituting the front unit, the diameter of the lens unit for compensating image blur can be reduced.

Further, the lens unit for compensating image blur is a sub lens unit consisting of a part of the lens unit which moves in an integrated manner with the aperture diaphragm during zooming. Therefore, image blur can be compensated with lens elements having smaller diameters.

Particularly in the zoom lens systems according to Embodiments 2 to 6, the sub lens unit for compensating image blur is located on the image side relative to the aperture diaphragm. Therefore, in the zoom lens systems according to Embodiments 2 to 6, which are capable of wide-angle image taking, even if an off-axis beam from a lens element located on the object side relative to the aperture diaphragm passes through a high position, since the diameter of the sub lens unit is small, size reduction in the entire zoom lens system is achieved.

In the zoom lens systems according to Embodiments 1 to 6, the front unit includes a lens unit having negative optical power, and the lens unit having negative optical power is composed of at least two lens elements. If the lens unit having negative optical power is composed of a single lens element, variation in aberration during zooming becomes considerable, which makes it difficult to achieve high performance of the zoom lens system. If the lens unit having negative optical power is composed of at most five lens elements, the overall length of lens system is shortened, which is effective for size reduction in the zoom lens system. Further, if the lens unit having negative optical power is composed of at most four lens elements and the at most four lens elements include one or two lens elements having positive optical power, a smaller zoom lens system having higher performance is realized.

Further, since the lens element, which is located closest to the object side in the lens unit having negative optical power, has negative optical power, an increase in the view angle is easily achieved, and thus a sufficient back focal length is easily secured during zooming.

In the zoom lens systems according to Embodiments 1 to 6, since the lens unit having the aperture diaphragm includes at least one cemented lens element, a mechanism for holding the plurality of lens units is simplified, and thus size reduction in the lens unit having the aperture diaphragm is easily achieved.

In the zoom lens systems according to Embodiments 1 to 6, since the lens unit having positive optical power is located closest to the image side, the telecentricity of light incident on the image sensor is enhanced, and thus reduction in the amount of peripheral light caused by the structure of the image sensor is suppressed.

In the zoom lens systems according to Embodiments 1 to 6, the space on the object side relative to the image surface S (that is, the space between the image surface S and the most image side lens surface of the lens unit located closest to the image side) consists of only air. However, an approximately parallel plate equivalent to such as an optical low-pass filter or a face plate of an image sensor may be provided in the space.

Each of the lens units constituting the zoom lens system according to any of Embodiments 1 to 6 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

The following will describe conditions preferred to be satisfied by a zoom lens system like the zoom lens systems according to Embodiments 1 to 6. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, a zoom lens system like the zoom lens systems according to Embodiments 1 to 6 satisfies the following condition (1) to effectively achieve size reduction thereof.

$$0.1 < BF/f_W < 2.0 \tag{1}$$

here, $\omega_W > 72°$, and $FNO_W < 2.9$
where
BF is a back focal length of the entire system at a wide-angle limit,
$f_W$ is a focal length of the entire system at a wide-angle limit,
$\omega_W$ is a view angle at a wide-angle limit, and
$FNO_W$ is an F-number at a wide-angle limit.

The condition (1) sets forth a back focal length (BF) which represents an air-equivalent distance between the image surface and an image side surface of a lens element having optical power, which is located closest to the image side among the lens elements constituting the zoom lens system. When the value exceeds the upper limit of the condition (1), the back focal length is increased and thereby the overall length of lens system becomes excessively long, which causes an increase in the size of the zoom lens system. Conversely, when the value goes below the lower limit of the condition (1), the image surface gets too close to the image side surface of the lens element having optical power and being located closest to the image side, which makes it difficult to arrange a mechanism for holding the image sensor and the lens element having optical power and being located closest to the image side.

In order to enhance the effect of the condition (1), it is preferred that at least one of the following conditions (1)' and (1)" is satisfied.

$$0.2 < BF/f_W \tag{1}'$$

$$BF/f_W < 1.7 \tag{1}''$$

For example, it is preferred that a zoom lens system like the zoom lens systems according to Embodiments 1 to 6 satisfies the following condition (2) to effectively achieve size reduction thereof.

$$0.01 < THs/Rmin < 1.00 \tag{2}$$

where
THs is a central interval between a surface located just on the object side relative to an aperture diaphragm and the aperture diaphragm, and
Rmin is a minimum radius of curvature among positive radiuses of curvature, of which surfaces having negative optical power, in a lens unit which is located just on the object side relative to the aperture diaphragm and moves in zooming from a wide-angle limit to a telephoto limit at the time of image taking.

In the above condition (2) and the condition (3) described later, the lens unit which is located just on the object side relative to the aperture diaphragm and moves in zooming from a wide-angle limit to a telephoto limit at the time of image taking may be the entirety of a lens unit or a sub lens unit consisting of a part of a lens unit.

The condition (2) sets forth the ratio of the central interval between a surface located just on the object side relative to an aperture diaphragm and the aperture diaphragm, to the minimum radius of curvature among positive radiuses of curvature, of which surfaces having negative optical power, in a lens unit which is located just on the object side relative to the aperture diaphragm and moves in zooming. When the value exceeds the upper limit of the condition (2), since the above radius of curvature is decreased, flare becomes great. This results in deterioration in image quality. Conversely, when the value goes below the lower limit of the condition (2), since the above radius of curvature is increased, curvature of field becomes great.

In order to enhance the effect of the condition (2), it is preferred that at least one of the following conditions (2)' and (2)" is satisfied.

$$0.05 < THs/Rmin \tag{2}'$$

$$THs/Rmin < 0.70 \tag{2}''$$

For example, it is preferred that a zoom lens system like the zoom lens systems according to Embodiments 1 to 6 satisfies the following condition (3) to effectively achieve size reduction thereof.

$$0.01 < TH\_GA/G\_SUM < 1.00 \tag{3}$$

where
TH_GA is a minimum axial interval between a lens unit which is located just on the object side relative to an aperture diaphragm and moves in zooming from a wide-angle limit to a telephoto limit at the time of image taking, and a lens unit which is located just on the object side relative to the lens unit which is located just on the object side relative to the aperture diaphragm and moves in zooming, and G_SUM is an axial thickness of a lens unit which is located just on the object side relative to the aperture diaphragm and moves in zooming from a wide-angle limit to a telephoto limit at the time of image taking.

The condition (3) sets forth the ratio of the minimum axial interval between a lens unit which is located just on the object side relative to an aperture diaphragm and moves in zooming, and a lens unit which is located just on the object side relative to the lens unit which is located just on the object side relative to the aperture diaphragm and moves in zooming, to the axial thickness of a lens unit which is located just on the object side relative to the aperture diaphragm and moves in zooming. When the value exceeds the upper limit of the condition (3), the thickness of the lens unit which is located just on the object side relative to the aperture diaphragm and moves in zooming is small and the lens unit becomes too thin. This results in difficulty in compensating aberrations. Conversely, when the value goes below the lower limit of the condition (3), the thickness of the lens unit which is located just on the object side relative to the aperture diaphragm and moves in zooming becomes too large, which results in increase in a thickness of a lens barrel at a retracted state.

In order to enhance the effect of the condition (3), it is preferred that at least one of the following conditions (3)' and (3)" is satisfied.

$$0.05 < TH\_GA/G\_SUM \quad (3)'$$

$$TH\_GA/G\_SUM < 0.30 \quad (3)''$$

Embodiment 7

Figure 19:
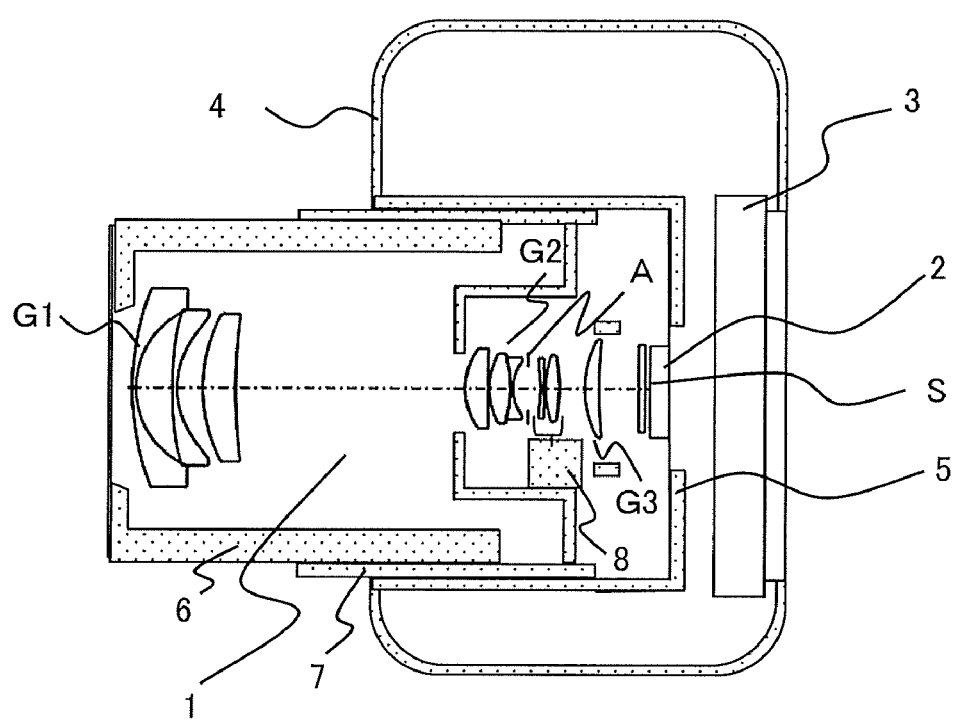
FIG. 19 is a schematic construction diagram of a digital still camera according to Embodiment 7.

FIG. 19 is a schematic construction diagram of a digital still camera according to Embodiment 7. In FIG. 19, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 4. In FIG. 19, the zoom lens system 1, in order from the object side to the image side, comprises a first lens unit G1, a second lens unit G2 having an aperture diaphragm A, and a third lens unit G3. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2 having the aperture diaphragm A, and the third lens unit G3 move to predetermined positions relative to the image sensor 2, so that zooming from a wide-angle limit to a telephoto limit is achieved. The third lens unit G3 is movable in an optical axis direction by a motor for focus adjustment.

In image blur compensation, a sub lens unit for image blur compensation, which consists of a part of the second lens unit G2, moves in a direction perpendicular to the optical axis by a motor 8 for image blur compensating lens, and thereby image point movement caused by vibration of the entire system can be compensated.

As such, when the zoom lens system according to Embodiment 4 is employed in a digital still camera, a small digital still camera is obtained that has a high resolution and high capability of compensating the curvature of field and that has a short overall length of lens system at the time of non-use. Here, in the digital still camera shown in FIG. 19, any one of the zoom lens systems according to Embodiments 1 to 3, 5 and 6 may be employed in place of the zoom lens system according to Embodiment 4. Further, the optical system of the digital still camera shown in FIG. 19 is applicable also to a digital video camera for moving images. In this case, moving images with high resolution can be acquired in addition to still images.

Here, the digital still camera according to the present Embodiment 7 has been described for a case that the employed zoom lens system 1 is a zoom lens system according to Embodiments 1 to 6. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 6.

Further, Embodiment 7 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 7, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 is caused to escape from the optical axis at the time of barrel retraction.

In the digital still camera according to the present Embodiment 7, the zoom lens systems according to Embodiments 1 to 6 can be employed. However, a zoom lens system which is adaptable for the digital still camera is not limited to these.

An imaging device comprising a zoom lens system according to Embodiments 1 to 6, and an image sensor such as a CCD or a CMOS may be applied to an imaging device in a mobile telephone, a PDA (Personal Digital Assistance), a surveillance camera in a surveillance system, a Web camera, a vehicle-mounted camera or the like, or applied to a camera system employing such a camera.

The following description is given for numerical examples in which the zoom lens system according to Embodiments 1 to 6 are implemented practically. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1-(1+\kappa)(h/r)^2}} + A4h^4 + A6h^6 + A8h^8 + A10h^{10}$$

Here, h is a height from an optical axis, κ is the conic constant, A4, A6, A8, and A10 are fourth-order, sixth-order, eighth-order, and tenth-order aspherical coefficients, respectively.

FIGS. 2, 5, 8, 11, 14, and 17 are longitudinal aberration diagrams of the zoom lens systems according to Embodiments 1, 2, 3, 4, 5, and 6, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, and 18 are lateral aberration diagrams of the zoom lens systems at a telephoto limit according to Embodiments 1, 2, 3, 4, 5, and 6, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where a sub lens unit for image blur compensation is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the sub lens unit.

Here, in the zoom lens system according to each example, the amount of movement of the sub lens unit in a direction perpendicular to the optical axis in an image blur compensation state at 0.6° at a telephoto limit is as follows.

| Example | Amount of movement (mm) |
|---|---|
| 1 | 0.18 |
| 2 | 0.49 |
| 3 | 0.47 |
| 4 | 0.15 |
| 5 | 0.20 |
| 6 | 0.30 |

As seen from the lateral aberration diagrams, satisfactory symmetry is obtained in the lateral aberration at the axial image point. Further, when the lateral aberration at the +70% image point and the lateral aberration at the −70% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to approximately 0.6° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data. Table 4 shows the single lens data. Table 5 shows the zoom lens unit data. Table 6 shows the magnification of zoom lens unit.

TABLE 1

(Surface data)

| Surface number | r | d | nd | vd |
|---|---|---|---|---|
| Object surface | ∞ | | | |
| 1 | 43.07000 | 2.42900 | 1.86746 | 41.6 |
| 2 | −171.16200 | Variable | | |
| 3 | −145.35100 | 0.40000 | 1.79796 | 30.0 |
| 4 | 11.48700 | 2.39000 | | |
| 5* | 78.37800 | 0.50000 | 1.69384 | 53.1 |
| 6* | 8.10400 | 1.54900 | | |
| 7 | 10.90800 | 1.61400 | 1.99000 | 19.0 |
| 8 | 21.16500 | Variable | | |
| 9 | 6.60700 | 1.72900 | 1.88312 | 40.7 |
| 10 | 49.03600 | 0.15000 | | |
| 11* | 6.55200 | 1.62200 | 1.77200 | 50.0 |
| 12 | −26.73400 | 0.00800 | 1.56732 | 42.8 |
| 13 | −26.73400 | 0.30000 | 1.91193 | 25.9 |
| 14 | 4.00400 | 1.44400 | | |
| 15(Diaphragm) | ∞ | 2.83400 | | |
| 16 | −4.72500 | 0.40000 | 1.48700 | 82.0 |
| 17 | −6.85300 | 0.10000 | | |
| 18 | 32.39500 | 1.11500 | 1.48778 | 81.8 |
| 19 | −9.16300 | Variable | | |
| 20 | 10.76400 | 1.27600 | 1.59684 | 46.7 |
| 21 | 37.04100 | Variable | | |
| Image surface | ∞ | | | |

TABLE 2

(Aspherical data)

Surface No. 5

K = 4.81915E+00, A4 = −1.40483E−04, A6 = 2.44424E−06,
A8 = 2.91612E−08, A10 = −5.16642E−10

Surface No. 6

K = 0.00000E+00, A4 = −2.07167E−04, A6 = −2.33689E−06,
A8 = 2.03945E−07, A10 = −3.22758E−09

Surface No. 11

K = 0.00000E+00, A4 = −3.44900E−04, A6 = −7.00104E−06,

TABLE 2-continued (Aspherical data)

A8 = −2.70187E−06   A10 = 1.79925E−07

TABLE 3

(Various data)

Zooming ratio   4.54235

| | Wide-angle limit | Middle position | Telephoto limit |
|---|---|---|---|
| Focal length | 4.7866 | 10.0154 | 21.7424 |
| F-number | 2.40244 | 3.16366 | 4.84039 |
| View angle | 41.0250 | 21.8816 | 10.1853 |
| Image height | 3.5600 | 3.9000 | 3.9000 |
| Overall length of lens system | 48.7835 | 42.0616 | 48.0126 |
| BF | 3.88128 | 5.01692 | 5.17959 |
| d2 | 0.2508 | 3.0722 | 5.8028 |
| d8 | 22.1323 | 7.7832 | 0.5039 |
| d19 | 2.6591 | 6.3293 | 16.6663 |
| d21 | 2.9813 | 4.1170 | 4.3042 |
| Entrance pupil position | 12.5040 | 15.8077 | 19.3686 |
| Exit pupil position | −11.6118 | −20.9753 | −150.8812 |
| Front principal points position | 15.8118 | 21.9639 | 38.0818 |
| Back principal points position | 43.9969 | 32.0462 | 26.2702 |

TABLE 4

(Single lens data)

| Lens element | Initial surface number | Focal length |
|---|---|---|
| 1 | 1 | 39.8786 |
| 2 | 3 | −13.3260 |
| 3 | 5 | −13.0648 |
| 4 | 7 | 21.0851 |
| 5 | 9 | 8.4843 |
| 6 | 11 | 6.9643 |
| 7 | 13 | −3.8010 |
| 8 | 16 | −33.2948 |
| 9 | 18 | 14.7733 |
| 10 | 20 | 24.9695 |

TABLE 5

(Zoom lens unit data)

| Lens unit | Initial surface No. | Focal length | Overall length of lens unit | Front principal points position | Back principal points position |
|---|---|---|---|---|---|
| 1 | 1 | 39.87859 | 2.42900 | 0.26288 | 1.38430 |
| 2 | 3 | −9.57293 | 6.45300 | 0.57604 | 1.79012 |
| 3 | 9 | 12.47936 | 9.70200 | 0.89986 | 0.23313 |
| 4 | 20 | 24.96952 | 1.27600 | −0.32150 | 0.16967 |

TABLE 6

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.33667 | −0.37376 | −0.41836 |
| 3 | 9 | −0.44551 | −0.89027 | −1.74168 |
| 4 | 20 | 0.80025 | 0.75477 | 0.74826 |

Numerical Example 2

The zoom lens system of Numerical Example 2 corresponds to Embodiment 2 shown in FIG. 4. Table 7 shows the surface data of the zoom lens system of Numerical Example 2. Table 8 shows the aspherical data. Table 9 shows the various data. Table 10 shows the single lens data. Table 11 shows the zoom lens unit data. Table 12 shows the magnification of zoom lens unit.

TABLE 7

(Surface data)

| Surface number | r | d | nd | vd |
|---|---|---|---|---|
| Object surface | ∞ | | | |
| 1 | 26.21600 | 0.50000 | 1.99000 | 19.0 |
| 2 | 18.18000 | 0.01000 | 1.56732 | 42.8 |
| 3 | 18.18000 | 3.21800 | 1.88300 | 40.8 |
| 4 | 92.50300 | Variable | | |
| 5* | 33.92600 | 0.40000 | 1.88300 | 40.8 |
| 6* | 7.70500 | 3.11600 | | |
| 7 | −200.00000 | 0.50000 | 1.88237 | 40.8 |
| 8 | 9.80200 | 1.29700 | | |
| 9 | 13.12700 | 1.79100 | 1.99000 | 19.0 |
| 10 | 55.26400 | Variable | | |
| 11* | 7.74600 | 1.53700 | 1.84075 | 41.6 |
| 12 | 282.98100 | 0.15000 | | |
| 13 | 6.51100 | 1.80300 | 1.72141 | 51.5 |
| 14 | −13.24500 | 0.00800 | 1.56732 | 42.8 |
| 15 | −13.24500 | 0.30000 | 1.91333 | 30.2 |
| 16 | 4.60600 | 1.44200 | | |
| 17 | ∞ | 1.70400 | | |
| (Diaphragm) | | | | |
| 18* | −5.24200 | 0.40000 | 1.60770 | 47.8 |
| 19* | −8.58700 | 0.10000 | | |
| 20 | 17.82200 | 1.50100 | 1.48700 | 82.0 |
| 21 | −9.15600 | Variable | | |
| 22* | 8.25400 | 1.19500 | 1.48714 | 82.0 |
| 23* | 16.35200 | Variable | | |
| Image surface | ∞ | | | |

TABLE 8

(Aspherical data)

Surface No.5

K = 0.00000E+00,   A4 = −2.81259E−04,   A6 = 6.17760E−06,
A8 = −7.73502E−08   A10 = 3.26589E−10
Surface No.6

K = 0.00000E+00,   A4 = −3.15341E−04,   A6 = −5.45723E−06,
A8 = 2.18153E−07   A10 = −5.06461E−09
Surface No.11

K = 0.00000E+00,   A4 = −3.66737E−05,   A6 = −6.96061E−06,
A8 = 6.76429E−07   A10 = −2.83645E−08
Surface No.18

K = 0.00000E+00,   A4 = 5.69582E−03,   A6 = −1.65211E−04,
A8 = −3.59569E−06   A10 = 4.26675E−08

TABLE 8-continued (Aspherical data)

Surface No.19

K = 0.00000E+00, A4 = 5.13051E−03, A6 = −1.88291E−04,
A8 = 0.00000E+00 A10 = 0.00000E+00
Surface No.22

K = 0.00000E+00, A4 = −5.79573E−04, A6 = 2.86286E−05,
A8 = −7.17748E−07 A10 = 0.00000E+00
Surface No.23

K = 0.00000E+00, A4 = −5.45657E−04, A6 = 3.58017E−05,
A8 = −8.85125E−07 A10 = 0.00000E+00

TABLE 9

(Various data)

Zooming ratio 8.74684

|  | Wide-angle limit | Middle position | Telephoto limit |
|---|---|---|---|
| Focal length | 4.4072 | 13.0564 | 38.5491 |
| F-number | 2.67906 | 3.63814 | 5.50315 |
| View angle | 43.3093 | 16.8058 | 5.6653 |
| Image height | 3.5600 | 3.9000 | 3.9000 |
| Overall length of lens system | 52.5477 | 51.9250 | 65.1990 |
| BF | 4.97926 | 8.41408 | 5.54771 |
| d4 | 0.2508 | 10.0642 | 18.9272 |
| d10 | 22.7508 | 6.6340 | 0.5008 |
| d21 | 3.5948 | 5.8407 | 19.2513 |
| d23 | 4.0474 | 7.4741 | 4.6816 |
| Entrance pupil position | 12.6459 | 33.5503 | 72.9609 |
| Exit pupil position | −9.7505 | −13.5986 | −71.0864 |
| Front principal points position | 15.7345 | 38.8625 | 92.1187 |
| Back principal points position | 48.1405 | 38.8686 | 26.6499 |

TABLE 10

(Single lens data)

| Lens element | Initial surface number | Focal length |
|---|---|---|
| 1 | 1 | −61.8216 |
| 2 | 3 | 25.1152 |
| 3 | 5 | −11.3714 |
| 4 | 7 | −10.5779 |
| 5 | 9 | 17.0302 |
| 6 | 11 | 9.4484 |
| 7 | 13 | 6.2915 |
| 8 | 15 | −3.7121 |
| 9 | 18 | −23.1921 |
| 10 | 20 | 12.6506 |
| 11 | 22 | 32.6361 |

TABLE 11

(Zoom lens unit data)

| Lens unit | Initial surface No. | Focal length | Overall length of lens unit | Front principal points position | Back principal points position |
|---|---|---|---|---|---|
| 1 | 1 | 43.48100 | 3.72800 | −0.87669 | 0.93857 |
| 2 | 5 | −8.23632 | 7.10400 | 0.59525 | 1.76394 |
| 3 | 11 | 12.81469 | 8.94500 | 0.69607 | 0.87156 |
| 4 | 22 | 32.63613 | 1.19500 | −0.78127 | −0.35277 |

TABLE 12

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.26057 | −0.37789 | −0.63685 |
| 3 | 11 | −0.48624 | −1.14375 | −1.77885 |
| 4 | 22 | 0.80001 | 0.69476 | 0.78259 |

Numerical Example 3

The zoom lens system of Numerical Example 3 corresponds to Embodiment 3 shown in FIG. 7. Table 13 shows the surface data of the zoom lens system of Numerical Example 3. Table 14 shows the aspherical data. Table 15 shows the various data. Table 16 shows the single lens data. Table 17 shows the zoom lens unit data. Table 18 shows the magnification of zoom lens unit.

TABLE 13

(Surface data)

| Surface number | r | d | nd | vd |
|---|---|---|---|---|
| Object surface | ∞ | | | |
| 1 | 22.96500 | 3.33300 | 1.65368 | 59.1 |
| 2 | 179.71200 | Variable | | |
| 3 | −1718.22800 | 0.40000 | 1.67154 | 57.3 |
| 4 | 7.65800 | 3.39200 | | |
| 5* | 80.38500 | 0.50000 | 1.69384 | 53.1 |
| 6* | 11.18300 | 1.65000 | | |
| 7 | 14.83800 | 1.32200 | 1.93902 | 25.0 |
| 8 | 39.23100 | Variable | | |
| 9 | 7.58500 | 2.25300 | 1.85318 | 30.2 |
| 10 | 65.22800 | 0.15700 | | |
| 11* | 8.67800 | 1.77900 | 1.77200 | 50.0 |
| 12 | −25.94900 | 0.00800 | 1.56732 | 42.8 |
| 13 | −25.94900 | 0.30000 | 1.92639 | 20.8 |
| 14 | 5.19600 | 1.63500 | | |
| 15 | ∞ | 1.47300 | | |
| (Diaphragm) | | | | |
| 16* | −11.24200 | 0.40000 | 1.50379 | 67.4 |
| 17* | −20.45500 | 0.10000 | | |
| 18 | 30.80700 | 1.27200 | 1.48700 | 82.0 |
| 19 | −13.25000 | Variable | | |
| 20 | 16.60800 | 1.11400 | 1.82613 | 23.9 |
| 21 | 111.90200 | Variable | | |
| Image surface | ∞ | | | |

TABLE 14

(Aspherical data)

Surface No.5

K = 0.00000E+00 A4 = −1.35325E−04, A6 = 9.21890E−07,
A8 = 5.32851E−08 A10 = −7.43092E−10

TABLE 14-continued (Aspherical data)

Surface No.6

K = 0.00000E+00    A4 = −2.57646E−04,    A6 = −1.83474E−06,
A8 = 1.26617E−07    A10 = −2.03744E−09

Surface No.11

K = 0.00000E+00    A4 = −2.96873E−04,    A6 = 1.43464E−07,
A8 = −1.07913E−06    A10 = 4.06193E−08

Surface No.16

K = 0.00000E+00,    A4 = 2.21390E−05,    A6 = −9.44767E−06,
A8 = 0.00000E+00    A10 = 0.00000E+00

Surface No.17

K = 0.00000E+00    A4 = 7.98058E−05,    A6 = −6.02891E−06,
A8 = 0.00000E+00    A10 = 0.00000E+00

TABLE 15

(Various data)

Zooming ratio    4.64640

|  | Wide-angle limit | Middle position | Telephoto limit |
|---|---|---|---|
| Focal length | 5.3507 | 8.5305 | 24.8617 |
| F-number | 1.97246 | 2.24636 | 3.35695 |
| View angle | 36.8515 | 25.4297 | 8.9346 |
| Image height | 3.5600 | 3.9000 | 3.9000 |
| Overall length of lens system | 52.9412 | 48.5383 | 54.7316 |
| BF | 6.46405 | 7.55581 | 8.50477 |
| d2 | 0.3508 | 3.6006 | 11.2367 |
| d8 | 22.3793 | 12.4426 | 0.5008 |
| d19 | 2.6591 | 3.8513 | 13.4013 |
| d21 | 5.5441 | 6.6294 | 7.6038 |
| Entrance pupil position | 14.5422 | 20.0537 | 38.9958 |
| Exit pupil position | −8.0381 | −10.2366 | −54.2795 |
| Front principal points position | 17.9187 | 24.4943 | 54.0126 |
| Back principal points position | 47.5905 | 40.0078 | 29.8699 |

TABLE 16

(Single lens data)

| Lens element | Initial surface number | Focal length |
|---|---|---|
| 1 | 1 | 39.9436 |
| 2 | 3 | −11.3520 |
| 3 | 5 | −18.7776 |
| 4 | 7 | 24.7637 |
| 5 | 9 | 9.8823 |
| 6 | 11 | 8.6167 |
| 7 | 13 | −4.6516 |
| 8 | 16 | −50.2756 |
| 9 | 18 | 19.2065 |
| 10 | 20 | 23.4829 |

TABLE 17

(Zoom lens unit data)

| Lens unit | Initial surface No. | Focal length | Overall length of lens unit | Front principal points position | Back principal points position |
|---|---|---|---|---|---|
| 1 | 1 | 39.94361 | 3.33300 | −0.29283 | 1.04146 |
| 2 | 3 | −10.25482 | 7.26400 | 0.13669 | 0.86783 |
| 3 | 9 | 14.23150 | 9.37700 | −0.59385 | 0.82964 |
| 4 | 20 | 23.48292 | 1.11400 | −0.10576 | 0.40142 |

TABLE 18

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.38108 | −0.43343 | −0.63997 |
| 3 | 9 | −0.50623 | −0.76052 | −1.60098 |
| 4 | 20 | 0.69439 | 0.64790 | 0.60749 |

Numerical Example 4

The zoom lens system of Numerical Example 4 corresponds to Embodiment 4 shown in FIG. 10. Table 19 shows the surface data of the zoom lens system of Numerical Example 4. Table 20 shows the aspherical data. Table 21 shows the various data. Table 22 shows the single lens data. Table 23 shows the zoom lens unit data. Table 24 shows the magnification of zoom lens unit.

TABLE 19

(Surface data)

| Surface number | r | d | nd | vd |
|---|---|---|---|---|
| Object surface | ∞ | | | |
| 1 | 27.51300 | 0.40000 | 1.88300 | 40.8 |
| 2 | 8.81800 | 3.80100 | | |
| 3* | 62.56100 | 0.50000 | 1.85400 | 40.4 |
| 4* | 8.65700 | 2.65900 | | |
| 5 | 16.09100 | 3.41900 | 1.98580 | 19.1 |
| 6 | 57.74800 | Variable | | |
| 7 | 6.86700 | 2.40400 | 1.65547 | 40.2 |
| 8 | 112.14000 | 0.15000 | | |
| 9* | 7.28200 | 2.17000 | 1.76801 | 49.2 |
| 10 | −12.16400 | 0.00800 | 1.56732 | 42.8 |
| 11 | −12.16400 | 0.30000 | 1.91084 | 29.6 |
| 12 | 4.78900 | 1.57100 | | |
| 13 (Diaphragm) | ∞ | 1.33800 | | |
| 14* | −7.85900 | 0.40000 | 1.68893 | 31.1 |
| 15* | −11.85000 | 0.10000 | | |
| 16 | 10.50600 | 1.42500 | 1.49480 | 80.5 |
| 17 | −17.73200 | Variable | | |
| 18 | 10.23700 | 1.50000 | 1.48700 | 82.0 |
| 19 | 47.86500 | Variable | | |
| Image surface | ∞ | | | |

TABLE 20

(Aspherical data)

Surface No.3

K = 4.81915E+00,    A4 = 3.46941E−04,    A6 = −1.05286E−05,
A8 = 1.98691E−07    A10 = −1.39198E−09

TABLE 20-continued (Aspherical data)

Surface No.4

K = 0.00000E+00    A4 = 1.47872E−04,    A6 = −1.59511E−05,
A8 = 3.38338E−07    A10 = −3.56802E−09
Surface No.9

K = 0.00000E+00    A4 = −2.54018E−04,    A6 = −7.77061E−06,
A8 = −3.05015E−07    A10 = 4.38948E−09
Surface No.14

K = 0.00000E+00,    A4 = 5.53123E−03,    A6 = −1.72108E−04,
A8 = 2.25238E−06    A10 = −1.26780E−07
Surface No.15

K = 0.00000E+00    A4 = 5.19401E−03,    A6 = −1.40377E−04,
A8 = 0.00000E+00    A10 = 0.00000E+00

TABLE 21

(Various data)

Zooming ratio 5.04495

|  | Wide-angle limit | Middle position | Telephoto limit |
|---|---|---|---|
| Focal length | 3.4068 | 7.6604 | 17.1870 |
| F-number | 2.06260 | 3.13606 | 5.59286 |
| View angle | 51.6200 | 28.5778 | 12.8972 |
| Image height | 3.5600 | 3.9000 | 3.9000 |
| Overall length of lens system | 53.9727 | 44.9594 | 54.5285 |
| BF | 5.06756 | 5.24435 | 5.00249 |
| d6 | 24.1010 | 7.6281 | 0.5008 |
| d17 | 2.6591 | 9.9419 | 26.8802 |
| d19 | 4.1367 | 4.2982 | 4.1141 |
| Entrance pupil position | 8.7001 | 7.8293 | 7.1424 |
| Exit pupil position | −8.0213 | −25.6001 | 242.5247 |
| Front principal points position | 11.2202 | 13.5872 | 25.5731 |
| Back principal points position | 50.5659 | 37.2989 | 37.3415 |

TABLE 22

(Single lens data)

| Lens element | Initial surface number | Focal length |
|---|---|---|
| 1 | 1 | −14.8457 |
| 2 | 3 | −11.8155 |
| 3 | 5 | 21.7421 |
| 4 | 7 | 11.0599 |
| 5 | 9 | 6.2331 |
| 6 | 11 | −3.7410 |
| 7 | 14 | −35.3148 |
| 8 | 16 | 13.5596 |
| 9 | 18 | 26.3947 |

TABLE 23

(Zoom lens unit data)

| Lens unit | Initial surface No. | Focal length | Overall length of lens unit | Front principal points position | Back principal points position |
|---|---|---|---|---|---|
| 1 | 1 | −9.94520 | 10.77900 | 0.64717 | 2.35908 |

TABLE 23-continued (Zoom lens unit data)

| Lens unit | Initial surface No. | Focal length | Overall length of lens unit | Front principal points position | Back principal points position |
|---|---|---|---|---|---|
| 2 | 7 | 13.27739 | 9.86600 | 0.26957 | 1.32671 |
| 3 | 18 | 26.39474 | 1.50000 | −0.27090 | 0.23336 |

TABLE 24

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.45072 | −1.02249 | −2.26650 |
| 3 | 18 | 0.76002 | 0.75332 | 0.76249 |

Numerical Example 5

The zoom lens system of Numerical Example 5 corresponds to Embodiment 5 shown in FIG. 13. Table 25 shows the surface data of the zoom lens system of Numerical Example 5. Table 26 shows the aspherical data. Table 27 shows the various data. Table 28 shows the single lens data. Table 29 shows the zoom lens unit data. Table 30 shows the magnification of zoom lens unit.

TABLE 25

(Surface data)

| Surface number | r | d | nd | vd |
|---|---|---|---|---|
| Object surface | ∞ | | | |
| 1 | 33.07800 | 3.36100 | 1.88467 | 40.0 |
| 2 | 187.67800 | Variable | | |
| 3 | 243.88800 | 0.40000 | 1.86731 | 41.6 |
| 4 | 8.61100 | 3.11600 | | |
| 5* | 33.44100 | 0.50000 | 1.69384 | 53.1 |
| 6* | 8.22500 | 2.69300 | | |
| 7 | 13.74400 | 1.38600 | 1.96213 | 20.9 |
| 8 | 28.06900 | Variable | | |
| 9 | 7.59800 | 1.56000 | 1.88723 | 38.8 |
| 10 | 96.35200 | 0.15000 | | |
| 11* | 7.91600 | 2.04000 | 1.77200 | 50.0 |
| 12 | −15.52400 | 0.00800 | 1.56732 | 42.8 |
| 13 | −15.52400 | 0.30000 | 1.92748 | 27.0 |
| 14 | 4.66600 | 1.33300 | | |
| 15 (Diaphragm) | ∞ | 1.97500 | | |
| 16* | −5.46000 | 0.40000 | 1.53704 | 51.0 |
| 17* | −7.88100 | 0.10000 | | |
| 18 | 19.66200 | 1.36600 | 1.48716 | 81.8 |
| 19 | −9.92200 | Variable | | |
| 20 | 11.18300 | 1.79300 | 1.50177 | 68.8 |
| 21 | 133.12300 | Variable | | |
| Image surface | ∞ | | | |

TABLE 26

(Aspherical data)

Surface No. 5

K = 4.81915E+00,    A4 = −1.52082E−04,    A6 = 2.33654E−06,
A8 = 5.39756E−08    A10 = −9.02184E−10
Surface No. 6

TABLE 26-continued (Aspherical data)

K = 0.00000E+00, A4 = −3.71267E−04, A6 = −2.17506E−06,
A8 = 1.96115E−07, A10 = −3.69473E−09

Surface No. 11

K = 0.00000E+00, A4 = −2.24963E−04, A6 = 1.95144E−06,
A8 = −1.85152E−06, A10 = 1.15426E−07

Surface No. 16

K = 0.00000E+00, A4 = 3.66678E−03, A6 = −7.67127E−05,
A8 = −2.55219E−06, A10 = 1.02005E−07

Surface No. 17

K = 0.00000E+00, A4 = 3.36746E−03, A6 = −9.35689E−05,
A8 = 0.00000E+00, A10 = 0.00000E+00

TABLE 27

(Various data)

Zooming ratio 4.54469

| | Wide-angle limit | Middle position | Telephoto limit |
|---|---|---|---|
| Focal length | 3.9875 | 8.1352 | 18.1220 |
| F-number | 2.60838 | 3.50685 | 5.45930 |
| View angle | 46.1998 | 26.5603 | 12.2314 |
| Image height | 3.5600 | 3.9000 | 3.9000 |
| Overall length of lens system | 53.9504 | 45.9622 | 53.7362 |
| BF | 3.58967 | 4.49925 | 5.57926 |
| d2 | 0.2508 | 1.7775 | 4.8058 |
| d8 | 23.2415 | 8.3095 | 0.5008 |
| d19 | 4.3874 | 8.8950 | 20.3693 |
| d21 | 2.6840 | 3.5953 | 4.6861 |
| Entrance pupil position | 11.7203 | 13.0159 | 17.1006 |
| Exit pupil position | −13.9274 | −28.4899 | 8364.3130 |
| Front principal points position | 14.8001 | 19.1450 | 35.2618 |
| Back principal points position | 49.9629 | 37.8270 | 35.6142 |

TABLE 28

(Single lens data)

| Lens element | Initial surface number | Focal length |
|---|---|---|
| 1 | 1 | 44.9318 |
| 2 | 3 | −10.2999 |
| 3 | 5 | −15.8496 |
| 4 | 7 | 26.7226 |
| 5 | 9 | 9.2207 |
| 6 | 11 | 7.0587 |
| 7 | 13 | −3.8407 |
| 8 | 16 | −35.1233 |
| 9 | 18 | 13.7442 |
| 10 | 20 | 24.2120 |

TABLE 29

(Zoom lens unit data)

| Lens unit | Initial surface No. | Focal length | Overall length of lens unit | Front principal points position | Back principal points position |
|---|---|---|---|---|---|
| 1 | 1 | 44.93181 | 3.36100 | −0.37771 | 1.21797 |
| 2 | 3 | −8.45713 | 8.09500 | 0.22962 | 0.90368 |
| 3 | 9 | 12.92145 | 9.23200 | 0.95271 | 0.96077 |
| 4 | 20 | 24.21203 | 1.79300 | −0.10896 | 0.49595 |

TABLE 30

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.24983 | −0.26163 | −0.28868 |
| 3 | 9 | −0.44504 | −0.90984 | −1.95132 |
| 4 | 20 | 0.79817 | 0.76060 | 0.71600 |

Numerical Example 6

The zoom lens system of Numerical Example 6 corresponds to Embodiment 6 shown in FIG. 16. Table 31 shows the surface data of the zoom lens system of Numerical Example 6. Table 32 shows the aspherical data. Table 33 shows the various data. Table 34 shows the single lens data. Table 35 shows the zoom lens unit data. Table 36 shows the magnification of zoom lens unit.

TABLE 31

(Surface data)

| Surface number | r | d | nd | vd |
|---|---|---|---|---|
| Object surface | ∞ | | | |
| 1 | 21.76900 | 2.69100 | 1.70196 | 55.4 |
| 2 | 760.72500 | Variable | | |
| 3 | 398.94100 | 0.40000 | 1.68301 | 56.7 |
| 4 | 7.95900 | 3.35900 | | |
| 5* | −143.97600 | 0.50000 | 1.69384 | 53.1 |
| 6* | 13.38800 | 1.55500 | | |
| 7 | 12.30300 | 1.04100 | 1.99000 | 19.0 |
| 8 | 19.96600 | Variable | | |
| 9 | 8.79600 | 1.63300 | 1.90935 | 24.0 |
| 10 | 154.40800 | 0.15000 | | |
| 11* | 8.93400 | 1.63500 | 1.77200 | 50.0 |
| 12 | −18.79700 | 0.00800 | 1.56732 | 42.8 |
| 13 | −18.79700 | 0.30000 | 1.91586 | 20.2 |
| 14 | 5.66400 | 1.43000 | | |
| 15 (Diaphragm) | ∞ | 1.73100 | | |
| 16* | −6.87300 | 0.40000 | 1.54515 | 52.9 |
| 17* | −12.32100 | 0.10000 | | |
| 18 | 38.39300 | 1.51300 | 1.52453 | 75.5 |
| 19 | −8.56900 | Variable | | |
| 20 | −97.96800 | 0.50000 | 1.52501 | 70.3 |
| 21 | 20.26200 | Variable | | |
| 22 | 11.29900 | 1.58700 | 1.90813 | 31.5 |
| 23 | 70.36800 | Variable | | |
| Image surface | ∞ | | | |

TABLE 32

(Aspherical data)

Surface No. 5

TABLE 32-continued (Aspherical data)

| | | |
|---|---|---|
| K = 4.81915E+00, | A4 = −1.21714E−04, | A6 = 1.78239E−06, |
| A8 = 4.64027E−08 | A10 = −8.88492E−10 | |
| Surface No. 6 | | |
| K = 0.00000E+00, | A4 = −1.00118E−04, | A6 = 2.42593E−07, |
| A8 = 1.17142E−07 | A10 = −1.80097E−09 | |
| Surface No. 11 | | |
| K = 0.00000E+00, | A4 = −1.35671E−04, | A6 = 1.43215E−06, |
| A8 = −9.27794E−07 | A10 = 4.72578E−08 | |
| Surface No. 16 | | |
| K = 0.00000E+00, | A4 = 6.27422E−04, | A6 = −1.83309E−05, |
| A8 = 0.00000E+00 | A10 = 0.00000E+00 | |
| Surface No. 17 | | |
| K = 0.00000E+00, | A4 = 7.45076E−04, | A6 = −1.48304E−05, |
| A8 = 0.00000E+00 | A10 = 0.00000E+00 | |

TABLE 33

(Various data)

Zooming ratio 4.67974

| | Wide-angle limit | Middle position | Telephoto limit |
|---|---|---|---|
| Focal length | 5.4611 | 11.0999 | 25.5564 |
| F-number | 2.50283 | 3.14065 | 4.63821 |
| View angle | 36.9761 | 19.9589 | 8.7725 |
| Image height | 3.5600 | 3.9000 | 3.9000 |
| Overall length of lens system | 53.9448 | 49.1666 | 53.4744 |
| BF | 5.69280 | 6.04192 | 5.86093 |
| d2 | 0.2508 | 3.6323 | 6.4315 |
| d8 | 22.0066 | 9.2968 | 0.5008 |
| d19 | 2.6822 | 6.9034 | 17.7393 |
| d21 | 2.7794 | 2.7592 | 2.4089 |
| d23 | 4.7544 | 5.0946 | 4.8407 |
| Entrance pupil position | 13.8985 | 19.8592 | 24.5511 |
| Exit pupil position | −19.9086 | −42.5845 | 352.0867 |
| Front principal points position | 18.1946 | 28.4253 | 51.9940 |
| Back principal points position | 48.4837 | 38.0668 | 27.9180 |

TABLE 34

(Single lens data)

| Lens element | Initial surface number | Focal length |
|---|---|---|
| 1 | 1 | 31.8773 |
| 2 | 3 | −11.8950 |
| 3 | 5 | −17.6308 |
| 4 | 7 | 30.3296 |
| 5 | 9 | 10.2027 |
| 6 | 11 | 8.0511 |
| 7 | 13 | −4.7246 |
| 8 | 16 | −29.2712 |
| 9 | 18 | 13.5052 |
| 10 | 20 | −31.9333 |
| 11 | 22 | 14.6348 |

TABLE 35

(Zoom lens unit data)

| Lens unit | Initial surface No. | Focal length | Overall length of lens unit | Front principal points position | Back principal points position |
|---|---|---|---|---|---|
| 1 | 1 | 31.87726 | 2.69100 | −0.04651 | 1.06575 |
| 2 | 3 | −9.01579 | 6.85500 | 0.73418 | 1.70094 |
| 3 | 9 | 13.63506 | 8.90000 | 1.74587 | 1.82634 |
| 4 | 20 | −31.93328 | 0.50000 | 0.27128 | 0.44389 |
| 5 | 22 | 14.63485 | 1.58700 | −0.15708 | 0.60871 |

TABLE 36

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 3 | −0.44520 | −0.53444 | −0.64076 |
| 3 | 9 | −0.48179 | −0.83162 | −1.59318 |
| 4 | 20 | 1.46778 | 1.50576 | 1.47434 |
| 5 | 22 | 0.54416 | 0.52031 | 0.53268 |

The following Table 37 shows the corresponding values to the individual conditions in the zoom lens systems of each of Numerical Examples.

TABLE 37

(Values corresponding to conditions)

| | | Numerical Example | | | | | |
|---|---|---|---|---|---|---|---|
| | Condition | 1 | 2 | 3 | 4 | 5 | 6 |
| (1) | $BF/f_W$ | 0.81 | 1.13 | 1.21 | 1.49 | 0.90 | 1.04 |
| | BF | 3.881 | 4.979 | 6.464 | 5.068 | 3.590 | 5.693 |
| | $f_W$ | 4.7866 | 4.4072 | 5.3507 | 3.4068 | 3.9875 | 5.4611 |
| (2) | THs/Rmin | 0.361 | 0.313 | 0.315 | 0.328 | 0.286 | 0.252 |
| | THs | 1.444 | 1.442 | 1.635 | 1.571 | 1.333 | 1.430 |
| | Rmin | 4.004 | 4.606 | 5.196 | 4.789 | 4.666 | 5.664 |
| (3) | TH_GA/ G_SUM | 0.132 | 0.132 | 0.111 | 0.100 | 0.123 | 0.134 |
| | TH_GA | 0.5039 | 0.5008 | 0.5008 | 0.5008 | 0.5008 | 0.5008 |
| | G_SUM | 3.809 | 3.798 | 4.497 | 5.032 | 4.058 | 3.726 |

The zoom lens system according to the present invention is applicable to a digital input device or a camera system, such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system having a plurality of lens units, each lens unit being composed of at least one lens element, the zoom lens system, in order from an object side to an image side, comprising:

a front unit having negative optical power as a whole, and including a first lens unit located closest to the object side; and a rear unit having positive optical power as a whole, wherein at least the front unit moves along an optical axis in zooming from a wide-angle limit to a telephoto limit at the time of image taking, the first lens unit is composed of at most three lens elements, the rear unit includes a lens unit having an aperture diaphragm between lens elements, an air space between which is not varied in zooming, a sub lens unit comprising a part of a lens unit constituting the rear unit moves in a direction perpendicular to the optical axis to optically compensate image blur, and the following conditions (1) and (2) are satisfied:

$$0.1 < BF/f_W < 2.0 \quad (1)$$

$$0.252 \leq THs/R_{min} < 1.00 \quad (2)$$

here, $\omega_W > 72°$, and $FNO_W < 2.9$ where

BF is a back focal length of the entire system at a wide-angle limit, $f_W$ is a focal length of the entire system at a wide-angle limit, THs is a center-axis interval between the image-side surface of a lens element located nearest the object side of the aperture diaphragm, and the aperture diaphragm itself, $R_{min}$ is the minimum value of the positive radiuses of curvature among the radiuses of curvature of the surfaces having negative optical power within a lens unit that is located nearest the object side of the aperture diaphragm and that moves in zooming from a wide-angle limit to a telephoto limit at the time of image taking, $\omega_W$ is a view angle at a wide-angle limit, and $FNO_W$ is an F-number at a wide-angle limit.

2. The zoom lens system as claimed in claim 1, wherein the front unit further includes a lens unit, different from the first lens unit, having negative optical power, and the lens unit having negative optical power is composed of at least two lens elements.

3. The zoom lens system as claimed in claim 2, wherein a lens element, which is located closest to the object side in the lens unit having negative optical power, has negative optical power.

4. The zoom lens system as claimed in claim 1, wherein the lens unit having the aperture diaphragm includes at least one cemented lens element.

5. The zoom lens system as claimed in claim 1, wherein a lens unit, which is located closest to the image side in the entire system, has positive optical power.

6. An imaging device capable of outputting an optical image of an object as an electric image signal, comprising:
a zoom lens system that forms an optical image of the object; and
an image sensor that converts the optical image formed by the zoom lens system into the electric image signal, wherein
the zoom lens system is a zoom lens system as claimed in claim 1.

7. A camera for converting an optical image of an object into an electric image signal and then performing at least one of displaying and storing of the converted image signal, comprising:
an imaging device including a zoom lens system that forms the optical image of the object and an image sensor that converts the optical image formed by the zoom lens system into the electric image signal, wherein
the zoom lens system is a zoom lens system as claimed in claim 1.

8. The zoom lens system as claimed in claim 1, wherein the first lens unit has negative optical power, and the first lens unit is composed of at least two lens elements.

9. The zoom lens system as claimed in claim 8, wherein a lens element, which is located closest to the object side in the first lens unit, has negative optical power.

* * * * *